United States Patent [19]
Lawrence

[11] Patent Number: 6,167,391
[45] Date of Patent: Dec. 26, 2000

[54] ARCHITECTURE FOR COROB BASED COMPUTING SYSTEM

[75] Inventor: P. Nick Lawrence, Austin, Tex.

[73] Assignee: Lawrence Technologies, LLC, Dallas, Tex.

[21] Appl. No.: 09/044,563

[22] Filed: Mar. 19, 1998

[51] Int. Cl.[7] ............................. G06F 15/18; G06F 17/00
[52] U.S. Cl. ............................... 706/26; 706/16; 707/103
[58] Field of Search ......................... 706/16, 26; 707/103

[56] References Cited

U.S. PATENT DOCUMENTS

| | | | |
|---|---|---|---|
| 4,625,242 | 11/1986 | Baumberg | 348/206 |
| 4,811,199 | 3/1989 | Kuechler et al. | 707/3 |
| 4,945,421 | 7/1990 | Baumberg | 348/206 |
| 4,972,363 | 11/1990 | Nguyen et al. | 708/801 |
| 5,093,900 | 3/1992 | Graf | 706/37 |
| 5,175,817 | 12/1992 | Adams et al. | 709/236 |
| 5,208,900 | 5/1993 | Gardner | 706/42 |
| 5,237,678 | 8/1993 | Kuechler et al. | 707/5 |
| 5,268,834 | 12/1993 | Sanner et al. | 364/151 |
| 5,371,834 | 12/1994 | Tawel | 706/25 |
| 5,386,558 | 1/1995 | Maudlin et al. | 707/104 |
| 5,438,646 | 8/1995 | Davidian | 706/41 |
| 5,446,681 | 8/1995 | Gethner et al. | 702/27 |
| 5,680,475 | 10/1997 | Zwierski et al. | 382/156 |
| 5,822,741 | 10/1998 | Fischthal | 706/16 |
| 5,918,232 | 6/1999 | Pouschine et al. | 707/103 |
| 6,026,397 | 2/2000 | Sheppard | 707/5 |

FOREIGN PATENT DOCUMENTS

| | | |
|---|---|---|
| 0 378 115 A2 | 7/1990 | European Pat. Off. . |
| 2 206 428 | 1/1989 | United Kingdom . |
| WO 93/14459 | 7/1993 | WIPO . |

OTHER PUBLICATIONS

"XP–002111789" paper, from Internet at www.It.com, Lawrence Technologies, 1996, two pages.

"XP–002111790" paper, from Internet at www.It.com, Lawrence Technologies, 1996, three pages.

*Primary Examiner*—Tariq R. Hafiz
*Assistant Examiner*—George Davis
*Attorney, Agent, or Firm*—Baker Botts L.L.P.

[57] ABSTRACT

A system for processing data includes a memory coupled to a processor. The memory stores a correlithm object that defines a point in a particular space, wherein the particular space is defined by a plurality of dimensions and including a plurality of points. The correlithm object is associated with each point using a metric. The memory further stores data associated with the correlithm object. The processor applies the metric to the correlithm object and each of the plurality of points in the particular space to generate a plurality of values defining a distribution having a mean and a standard of deviation such that the ratio of the mean to the standard of deviation increases with the number of dimensions of the particular space.

124 Claims, 11 Drawing Sheets

```
 1  #include <stdio.h>
 2  #include <stdlib.h>
 3  #include <math.h>
 4  #include <limits.h>
 5
 6  #define NBR_OF_DIMS (100)
 7  #define NBR_OF_COROBS (1000)
 8
 9  typedef struct {
10    double val[NBR_OF_DIMS];
11    double sig[NBR_OF_DIMS];
12  } COROB;
13  COROB corob[NBR_OF_COROBS];
14
15  int assign_corob_to_index(int new_index) {
16    if ((new_index<0) || (NBR_OF_COROBS<=new_index)) {return -1;}
17    generate_corob(&corob[new_index]);
18    return new_index;
19  }
20
21  int find_nearest_corob(double *distance, COROB *c) {
22    int i, idx=-1; double d;
23    *distance = (double)NBR_OF_DIMS;
24    for (i=0; i<NBR_OF_COROBS; i++) {
25      metric(&d, &corob[i], c);
26      if (c < *distance) {*distance = d; idx = i;}
27    }
28    return idx;
29  }
30
31  int generate_corob(COROB *c) {
32    int i; for (i=0; i<NBR_OF_DIMS; i++) {
33      c->val[i] = (double)random()/(double)LONG_MAX;
34      c->sig[i] = (double)random()/(double)LONG_MAX;
35    }
36  }
37
38  int metric(double *distance, COROB *to, COROB *from) {
39    int i; double xi, sum=0.0;
40    for (i=0; i<NBR_OF_DIMS; i++) {
41      xi = from->val[i] - to->val[i];
42      sum += (from->sig[i] * xi * xi);
43    }
44    *distance = sqrt(sum);
45  }
```

```
1  #include <stdio.h>
2  #include <stdlib.h>
3  #include <math.h>
4  #include <limits.h>
5
6  #define NBR_OF_DIMS (100)
7  #define NBR_OF_COROBS (1000)
8
9  typedef struct {
10    double val[NBR_OF_DIMS];
11    double sig[NBR_OF_DIMS];
12  } COROB;
13  COROB corob[NBR_OF_COROBS];
14
15  int assign_corob_to_index(int new_index) {
16    if ((new_index<0) || (NBR_OF_COROBS<=new_index)) {return -1;}
17    generate_corob(&corob[new_index]);
18    return new_index;
19  }
20
21  int find_nearest_corob(double *distance, COROB *c) {
22    int i, idx=-1; double d;
23    *distance = (double)NBR_OF_DIMS;
24    for (i=0; i<NBR_OF_COROBS; i++) {
25      metric(&d, &corob[i], c);
26      if (d < *distance) {*distance = d; idx = i;}
27    }
28    return idx;
29  }
30
31  int generate_corob(COROB *c) {
32    int i; for (i=0; i<NBR_OF_DIMS; i++) {
33      c->val[i] = (double)random()/(double)LONG_MAX;
34      c->sig[i] = (double)random()/(double)LONG_MAX;
35    }
36  }
37
38  int metric(double *distance, COROB *to, COROB *from) {
39    int i; double xi, sum=0.0;
40    for (i=0; i<NBR_OF_DIMS; i++) {
41      xi = from->val[i] - to->val[i];
42      sum += (from->sig[i] * xi * xi);
43    }
44    *distance = sqrt(sum);
45  }
```

Fig. 3

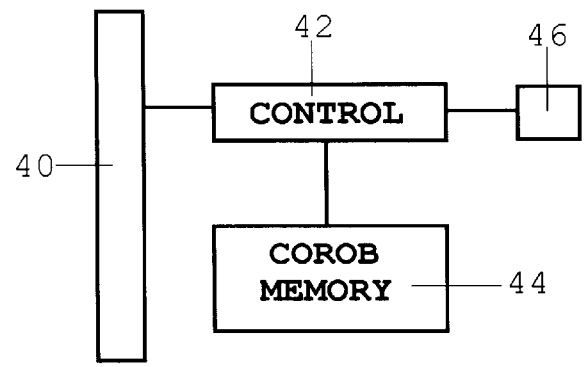

Fig. 4

```
1  #define TOLERANCE (1.0e-10)
2  #define MAX_PAIRS (100)
3
4  typedef struct {
5     float val;
6     float sig;
7  } STATE;
8
9  typedef struct {
10    int nbr_of_dims;
11    float *val;
12    float *sig;
13 } COROB;
14
15 typedef struct {
16    int nbr_of_dims;
17    COROB input_corob;
18    STATE current_state;
19    struct {
20       int nbr_of_entries;
21       COROB corob[MAX_PAIRS];
22       STATE state[MAX_PAIRS];
23    } corob_memory;
24 } CELL;
25
26 STATE *make_state(void);
27 COROB *make_corob(int nbr_of_dims);
28 CELL *make_cell(int nbr_of_dims);
29 void load_input(CELL *cell, COROB corob);
30 void load_output(CELL *cell, STATE state);
31 void learn(CELL *cell);
32 void execute(CELL *cell);
33 float metric(COROB to, COROB from);
```

Fig. 5

```
1 STATE *make_state(void) {
2   STATE *state;
3   state = (STATE *)calloc(1, sizeof(state));
4   state->val = (float)random()/(float)LONG_MAX;
5   state->sig = (float)random()/(float)LONG_MAX;
6   return state;
7 }
```

Fig. 6

```
1 COROB *make_corob(int nbr_of_dims) {
2   int i; COROB *corob;
3   corob = (COROB *)calloc(1, sizeof(COROB));
4   corob->nbr_of_dims = nbr_of_dims;
5   corob->val = (float *)calloc(nbr_of_dims, sizeof(float));
6   corob->sig = (float *)calloc(nbr_of_dims, sizeof(float));
7   for (i=0; i<corob->nbr_of_dims; i++) {
8     corob->val[i] = (float)random()/(float)LONG_MAX;
9     corob->sig[i] = (float)random()/(float)LONG_MAX;
10   }
11   return corob;
12 }
```

Fig. 7

```
1  CELL *make_cell(int nbr_of_dims) {
2    /* create a cell of given dims, return in *cell */
3    int i; CELL *cell;
4    cell = (CELL *)calloc(1, sizeof(CELL));
5    cell->nbr_of_dims = nbr_of_dims;
6    cell->input_corob.val = (float *)calloc(nbr_of_dims,
sizeof(float));
7    cell->input_corob.sig = (float *)calloc(nbr_of_dims,
sizeof(float));
8    cell->corob_memory.nbr_of_entries = 0;
9    for (i=0; i<MAX_PAIRS; i++) {
10     cell->corob_memory.corob[i].nbr_of_dims = nbr_of_dims;
11     cell->corob_memory.corob[i].val=(float
*)calloc(nbr_of_dims,sizeof(float));
12     cell->corob_memory.corob[i].sig=(float
*)calloc(nbr_of_dims,sizeof(float));
13   }
14   return cell;
15 }
```

Fig. 8

```
1 void load_input(CELL *cell, COROB corob) {
2   /* load input_corob of cell with corob */
3   int i;
4   for (i=0; i<cell->nbr_of_dims; i++) {
5     cell->input_corob.val[i] = corob.val[i];
6     cell->input_corob.sig[i] = corob.sig[i];
7   }
8   cell->input_corob.nbr_of_dims = corob.nbr_of_dims;
9 }
```

Fig. 9

```
1 void load_output(CELL *cell, STATE state) {
2   /* set the current_state of cell from state */
3   cell->current_state.val = state.val;
4   cell->current_state.sig = state.sig;
5 }
```

Fig. 10

```
1 void learn(CELL *cell) {
2   /* put input_corob and current_state of cell into cell's
corob_memory */
3   int i, idx;
4   idx = cell->corob_memory.nbr_of_entries;
5   for (i=0; i<cell->nbr_of_dims; i++) {
6     cell->corob_memory.corob[idx].val[i] =
cell->input_corob.val[i];
7     cell->corob_memory.corob[idx].sig[i] =
cell->input_corob.sig[i];
8   }
9   cell->corob_memory.state[idx].val = cell->current_state.val;
10   cell->corob_memory.state[idx].sig = cell->current_state.sig;
11   cell->corob_memory.nbr_of_entries++;
12 }
```

Fig. 11

```
1  void execute(CELL *cell) {
2    /* gen new current_state from input_corob and corob_memory */
3    int i; float *mt, *wt, totwt, sig; STATE state;
4
5    /* generate metric vector */
6    mt = (float
*)calloc(cell->corob_memory.nbr_of_entries,sizeof(float));
7    for (i=0; i<cell->corob_memory.nbr_of_entries; i++) {
8      mt[i] = metric(cell->corob_memory.corob[i],
cell->input_corob);
9    }
10
11   /* from metric vector generate weight vector */
12   wt = (float
*)calloc(cell->corob_memory.nbr_of_entries,sizeof(float));
13   totwt = 0.0;
14   for (i=0; i<cell->corob_memory.nbr_of_entries; i++) {
15     mt[i] = (mt[i] < TOLERANCE) ? TOLERANCE : mt[i]; /*prevent
div 0 */
16     wt[i] = 1.0 / (mt[i]*mt[i]);
17     totwt += wt[i];
18   }
19   for (i=0; i<cell->corob_memory.nbr_of_entries; i++) {
20     wt[i] /= totwt; /* normalize */
21   }
22
23   /* from weight vector generate interpolated value */
24   state.val = 0.0;
25   for (i=0; i<cell->corob_memory.nbr_of_entries; i++) {
26     state.val += (wt[i] * cell->corob_memory.state[i].val);
27   }
28
29   /* generate a significance measure */
30   sig = 0.0;
31   for (i=0; i<cell->corob_memory.nbr_of_entries; i++) {
32     sig = (sig < wt[i]) ? wt[i] : sig;
33   }
34   cell->current_state.sig = sig;
35
36   /* tradeoff interpolated val with random val by sig */
37   cell->current_state.val =
38     sig * state.val + (1.0 - sig) * random() / LONG_MAX;
39
40   /* clean up */
41   free(mt);
42   free(wt);
43 }
```

Fig. 12

```
1  float metric(COROB to, COROB from) {
2    int i; float xi, sum=0.0;
3    for (i=0; i<from.nbr_of_dims; i++) {
4      xi = from.val[i] - to.val[i];
5      sum += (from.sig[i] * xi * xi);
6    }
7    return sqrt(sum);
8  }
```

Fig. 13

```
1  #include <stdio.h>
2  #include <stdlib.h>
3  #include <math.h>
4  #include <limits.h>
5  #include "cell.h"
6  #define NBR_OF_DIMS (100)
7  void main(int argc, char **argv) {
8    int i; CELL *cell; COROB *corob; STATE *state; float fuzz, fract;
9    fract = atof(argv[1]);
10   cell = make_cell(NBR_OF_DIMS);
11   for(i=0; i<MAX_PAIRS; i++) {
12     corob = make_corob(NBR_OF_DIMS);
13     load_input(cell,*corob);
14     state = make_state();
15     load_output(cell, *state);
16     learn(cell);
17     free(corob);
18     free(state);
19   }
20   corob = make_corob(NBR_OF_DIMS);
21   for (i=0; i<NBR_OF_DIMS; i++) {
22     fuzz = (((float)random()/(float)LONG_MAX)-0.5)*fract;
23     corob->val[i] = cell->corob_memory.corob[0].val[i] + fuzz;
24     corob->val[i] = (corob->val[i] < 0.0) ? 0.0 : corob->val[i];
25     corob->val[i] = (corob->val[i] < 0.0) ? 0.0 : corob->val[i];
26
27     corob->sig[i] = cell->corob_memory.corob[0].sig[i] + fuzz;
28     corob->sig[i] = (corob->sig[i] < 0.0) ? 0.0 : corob->sig[i];
29     corob->sig[i] = (corob->sig[i] < 0.0) ? 0.0 : corob->sig[i];
30   }
31   load_input(cell,*corob);
32   printf("noise factor: fract=%f\n",fract);
33   printf("original val=%f\n",cell->corob_memory.state[0].val);
34   execute(cell);
35   printf("cell generates val=%f with sig=%f\n",
36     cell->current_state.val,cell->current_state.sig);
37 }
```

Fig. 14

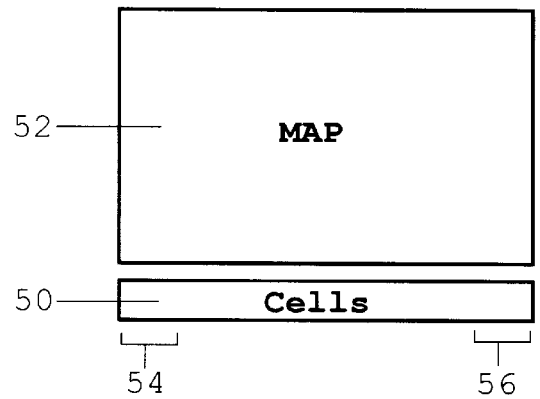

Fig. 15

```
1  typedef struct {
2    int nbr_of_cells;
3    int *map;
4  } MAP;
5
6  typedef struct {
7    int nbr_of_cells;
8    MAP *sensor;
9    MAP *actor;
10   MAP **internal;
11   CELL **cell;
12   COROB *prev_state;
13 } COROB_SYSTEM;
14
15 MAP *make_map(int nbr_of_cells, int *map_data);
16 COROB_SYSTEM *make_corob_system(int nbr_of_cells, int
nbr_of_dims[],
17   int *sensor, int *actor, int internal[][]);
18 void execute_cells(COROB_SYSTEM *cs);
```

Fig. 16

```
1  MAP *make_map(int nbr_of_cells, int *map_data) {
2    int i; MAP *map;
3    map = (MAP *)calloc(1, sizeof(MAP));
4    map->nbr_of_cells = nbr_of_cells;
5    map->map = (int *)calloc(nbr_of_cells, sizeof(int));
6    for (i=0; i<nbr_of_cells; i++) {map->map[i] = map_data[i];}
7    return map;
8  }
```

Fig. 17

```
1 COROB_SYSTEM *make_corob_system(
2   int nbr_of_cells, int nbr_of_dims[nbr_of_cells],
3   int *sensor, int *actor, int
internal[nbr_of_cells][nbr_of_cells]) {
4   int i; COROB_SYSTEM *cs;
5   cs = (COROB_SYSTEM *)calloc(1, sizeof(COROB_SYSTEM));
6   cs->nbr_of_cells = nbr_of_cells;
7   cs->sensor = make_map(nbr_of_cells, sensor);
8   cs->actor = make_map(nbr_of_cells, actor);
9   cs->internal = (MAP **)calloc(nbr_of_cells, sizeof(MAP *));
10  cs->cell = (CELL **)calloc(nbr_of_cells, sizeof(CELL *));
11  for (i=0; i<nbr_of_cells; i++) {
12    cs->internal[i] = make_map(nbr_of_cells, &internal[i][0]);
13    cs->cell[i] = make_cell(nbr_of_dims[i]);
14  }
15  cs->prev_state = make_corob(nbr_of_cells);
16  return cs;
17 }
```

Fig. 18

```
1 void execute_cells(COROB_SYSTEM *cs) {
2   int i,j,k;
3   for (i=0; i<cs->nbr_of_cells; i++) {
4     cs->prev_state->val[i] = cs->cell[i]->current_state.val;
5     cs->prev_state->sig[i] = cs->cell[i]->current_state.sig;
6   }
7   for (i=0; i<cs->nbr_of_cells; i++) {
8     /* load this cell's input_corob from prev_state corob */
9     k=0;
10     for (j=0; j<cs->internal[i]->nbr_of_cells; j++) {
11       if (cs->internal[i]->map[j] == 0) {continue;}
12       else {
13         cs->cell[i]->input_corob.val[k] =
cs->prev_state->val[j];
14         cs->cell[i]->input_corob.sig[k] =
cs->prev_state->sig[j];
15         k++;
16       }
17     }
18     /* operate the cell */
19     execute(cs->cell[i]);
20   }
21 }
```

Fig. 19

```
1  #include <stdio.h>
2  #include <stdlib.h>
3  #include <math.h>
4  #include <limits.h>
5  #include "cell.h"
6  #include "corob_system.h"
7
8  #define NBR_OF_CELLS (10)
9  #define CASES (100)
10
11 void main(void);
12 void set_sensor(COROB_SYSTEM *cs, COROB *corob);
13
14 COROB_SYSTEM cs;
15
16 int sensor_map[NBR_OF_CELLS] = {1, 1, 1, 1, 1, 0, 0, 0, 0, 0};
17
18 int actor_map[NBR_OF_CELLS] = {0, 0, 0, 0, 0, 1, 1, 1, 1, 1};
19
20 int internal_map[NBR_OF_CELLS][NBR_OF_CELLS] = {
21    {0, 0, 0, 0, 0, 0, 0, 0, 0, 0},
22    {0, 0, 0, 0, 0, 0, 0, 0, 0, 0},
23    {0, 0, 0, 0, 0, 0, 0, 0, 0, 0},
24    {0, 0, 0, 0, 0, 0, 0, 0, 0, 0},
25    {0, 0, 0, 0, 0, 0, 0, 0, 0, 0},
26    {1, 1, 1, 1, 1, 0, 0, 0, 0, 0},
27    {1, 1, 1, 1, 1, 0, 0, 0, 0, 0},
28    {1, 1, 1, 1, 1, 0, 0, 0, 0, 0},
29    {1, 1, 1, 1, 1, 0, 0, 0, 0, 0},
30    {1, 1, 1, 1, 1, 0, 0, 0, 0, 0},
31    };
32
33 int nbr_of_dims[NBR_OF_CELLS] = {0, 0, 0, 0, 0, 5, 5, 5, 5, 5};
```

Fig. 20

```
1 void set_sensor(COROB_SYSTEM *cs, COROB *corob) {
2   /* load cs current_state with corob */
3   int i;
4   for (i=0; i<corob->nbr_of_dims; i++) {
5     cs->cell[i]->current_state.val = corob->val[i];
6     cs->cell[i]->current_state.sig = corob->sig[i];
7   }
8 }
```

Fig. 21

```
1  void main(void) {
2    int i,j,k; COROB_SYSTEM *cs; COROB *cin[CASES+1], *rslt;
3
4    /* architecture phase */
5    cs = make_corob_system(
6      NBR_OF_CELLS,nbr_of_dims,sensor_map,actor_map,internal_map);
7
8    /* education phase */
9      /* load corob_memories of cells with cases */
10   for (i=0; i<CASES+1; i++) {cin[i] = make_corob(5);}
11   for (i=0; i<CASES; i++) {
12     for (j=0,k=0; j<NBR_OF_CELLS; j++) {
13       if (nbr_of_dims[j] == 0) continue;
14       load_input(cs->cell[j], *cin[i]);
15       cs->cell[j]->current_state.val = cin[i+1]->val[k];
16       cs->cell[j]->current_state.sig = 1.0;
17       k++;
18       learn(cs->cell[j]);}
19   }
20
21   /* operation phase */
22     /* set up rslt storage for actor */
23   rslt = make_corob(5);
24     /* set up sensor first time */
25   for (j=0,k=0; j<NBR_OF_CELLS; j++) {
26     if (nbr_of_dims[j] == 0) {continue;}
27     set_sensor(cs, cin[0]);
28     k++;}
29   for (i=0; i<CASES; i++) {
30     /* execute cells */
31     execute_cells(cs);
32     /* extract and process actor */
33     for (j=0,k=0; j<NBR_OF_CELLS; j++) {
34       if (nbr_of_dims[j] == 0) {continue;}
35       rslt->val[k] = cs->cell[j]->current_state.val;
36       k++;}
37     /* Learn? Not in this example */
38     /* set up sensor */
39     for (j=0,k=0; j<NBR_OF_CELLS; j++) {
40       if (nbr_of_dims[j] == 0) {continue;}
41       set_sensor(cs, rslt);
42       k++;}
43   }
44   printf("iteration %d: metric=%f\n",i,metric(*rslt,*cin[CASES]));
45 }
```

Fig. 22

ARCHITECTURE FOR COROB BASED COMPUTING SYSTEM

FIELD OF THE INVENTION

The present invention relates to programmatic corob based computing systems. In particular, the invention relates to a computing system architecture that uses corobs to represent and process data.

BACKGROUND OF THE INVENTION

It has long been recognized that the information processing capabilities of traditional computing systems differ significantly from those of animal intelligence, including human intelligence. Living systems of animal intelligence excel at solving problems by appealing to analogies with past experience. Traditional digital computing systems excel at following a sequence of steps to arrive at a result. Traditional analog computing systems excel at very specific computational tasks, namely those that involve solving differential equations. Traditional connectionist computing systems excel at implementing interpolations from one multidimensional space to another, based on examples connecting the two spaces at points. The traditional computational systems generically grouped under the term "artificial intelligence systems" do in fact attempt to emulate processing capabilities found in animal intelligence, but the success of such attempts has been limited.

The information processing capabilities of living systems of animal intelligence are analogic and very robust in nature. Such systems excel at seeing and doing things that are analogous to things seen and done in the past and are very forgiving of errors in data. The term, correlithm, is often used to describe generically the processes for which living information processing systems excel, to distinguish them from algorithms, the processes for which traditional information processing systems excel. The construction of computing systems able to approach or duplicate these and other unique information processing capabilities of living systems has been one of the most elusive and intensely pursued goals of research and development in the entire history of constructed computing systems, yet results to date have been meager.

Traditional computing systems simply are not very good at the sorts of tasks at which living computing systems excel.

Traditional digital computing systems are exceedingly precise, but brittle. Computation in these systems is accomplished through an exquisitely orchestrated sequence of discrete steps involving exact data. Errors of so little as a single bit, the smallest unit of data distinction available in these systems, in either the sequence of steps or in the data, will frequently render the result of the computation useless. Elaborate efforts have been directed over the years at both the hardware systems and at the software programs such hardware executes, to avoid or minimize such errors. The precision of such traditional digital computing systems and the success in avoiding the brittleness of execution imposed by such precision have both been key strengths in the growth of the digital computing industry. Precision and brittleness, however, are very far from the robust, analogic information processing found in living systems.

Typically, traditional analog computing systems are used to solve mathematical equations, particularly differential equations, through exploration. Electronic circuit equivalents of mathematical operators such as addition, multiplication, integration, and so forth are interconnected to produce an overall electronic equivalent of a specific equation. By varying parameters of the individual circuits, the overall electronic equivalent is exercised to explore the characteristics of the equation it implements. While analog computing systems provide a highly useful functionality, it is clear that the types of computation adaptable to this form of computing are extremely specific and limited. Moreover, living systems are not good at solving equations. It seems unlikely, therefore, that analog computers could contribute substantially in the quest to emulate living information processing systems, and in fact to date analog computers have made no such contribution.

As a class, traditional connectionist computing systems function as interpolation systems. The interpolation functions provided by many connectionist systems are derived from specific examples, called the "training set," that lists points in the domain space of the interpolation function and for each of those points, specifies the unique image point in the interpolation function's range space. Other connectionist systems utilize a training set consisting only of domain space points, developing their own unique and suitable range points for each of the domain points. The details of connectionist computing system architectures, designs, and operations vary widely, as do the means employed by each such systems to derive acceptable interpolation functions from training sets. For each training set, there are typically many alternative connectionist systems that will provide essentially equivalent results, but ultimately, all connectionist computing systems provide an appropriate mathematical mapping from one multidimensional space to another. Connectionist systems have proved to provide a very useful functionality, and one that may in fact be analogous to certain low level elements of animal intelligence systems, but it is hard to see how anything like the full range of animal intelligence information processing capabilities emerges solely from connectionist functionality.

Traditionally, the computing systems grouped under the term of "artificial intelligence" have focused directly on trying to duplicate or approach the various information processing characteristics of animal intelligence systems. Aspects of the field of artificial intelligence include expert systems, pattern recognition, robotics, heuristics, and a variety of data structuring, sorting, and searching techniques. There have been so many spectacular failures in the storied history of this field that today most computer scientists view it with some skepticism. Although isolated successes have been achieved, the often heard comment remains true that "these systems work for the cases to which they apply, and fail otherwise." At the heart of the failures lies the fact that artificial intelligence technology, as traditionally practiced, is very brittle. What is lacking is precisely the sort of robust, analogic capabilities always found in abundance in living information processing systems. This seems odd, given the extensive efforts expended over the years to achieve artificially intelligent systems, but it brings into sharp focus the inescapable fact that the entire computing industry has somehow "missed the point" in this matter!

It is not known today exactly how data is represented, stored, and manipulated in living information processing systems. The work to discover these secrets has been extensive and sustained over many years, and has been focused intensely on the biochemical, neurophysiological, and structural details of living neural systems. Some limited computational mechanisms have been identified by this work, but no mathematical data token for generically representing information in living neural systems has been described, no generic theory of data manipulation and computation in living neural systems has been set forth, and most importantly, no comprehensive, general theory has emerged that describes and accounts for the computational capabilities of animal intelligence systems in ways that are sufficient to support the engineering of new, non-living systems capable of exhibiting similar information processing characteristics.

OBJECTS OF THE INVENTION

Accordingly, a general object of this present invention is to provide an architecture for a computing system that overcomes the deficiencies of the prior art.

Similarly, an object of the present invention is to provide an architecture for a computing system whose computational strengths lie in areas similar to the areas of computational strengths of living information processing systems.

A further object of the present invention is to provide a computing system architecture that greatly increases ana-logic functionality, the ability of a system to "see and do" things that are similar to things "seen and done" in the past.

An additional object of the present invention is to provide a computing system architecture that greatly increases robustness, the ability to be forgiving of errors, over a very broad range of information processing tasks.

An additional object of the present invention is to provide componentry that takes advantage of corobs, the unique mathematical and computational data objects that I have discovered that may well underlie the functionality of living information processing systems.

An additional object of the present invention is to provide a computing system architecture that employs corobs.

An additional object of the present invention is to provide a corob based computing system architecture that is "Turing complete," that is, capable of implementing any computable function, subject only to the limitations of physical memory and time.

An additional object of the present invention is to provide means to utilize corobs as data tokens.

An additional object of the present invention is to provide means to accomplish information processing utilizing corobs.

An additional object of the present invention is to provide means to accomplish parallel processing with corobs.

Other objects and advantages of the invention will become apparent upon reading the following description and appended claims, and upon reference to the accompanying drawings.

SUMMARY OF THE INVENTION

Briefly, with the present invention it has been discovered that a very simple construct, the "corob", has important computational properties that are not obvious and that support a new paradigm for computation that has new computational strengths in correlithms, precisely those areas of computation formerly considered to be the domain of living information processing systems. The present invention teaches a computing system architecture that embodies this new computational paradigm and that accesses these new computational strengths.

The objects of the invention are achieved with a computing system architecture that implements the new computational paradigm by employing corobs as the primary data tokens for representing and manipulating information, and thereby taking advantage of the mathematical and computational properties of corobs that I have discovered. A construct suitable for containing a corob for further use is described. A low level architectural component, called a "cell," is defined whose function is to map input corobs to output state values in a manner consistent with corobs and associated state values previously stored by that cell. Cells are combined into a computing architecture that supports defining cell inter-relationships such that the current state of any cell can provide a component of the input corob of any cell in the computing system. Input to the computing system is achieved by influencing state values of specified "input" cells. Output from the system is likewise achieved by extracting the state values of specified "output" cells.

According to the present invention, the structure of the corob based computing system is very flexible. A given corob based computing system is comprised of a definite number of available cells. All corob based computing systems may support three distinct phases of programming and use, the architecture phase, the education phase, and the operation phase.

Practical consequences of using corobs in computation mean that many of the long elusive computational properties of living information processing systems are now made available in a readily accessible form. These properties include an animal-like ability to see and do things that are like things seen and done in the past, a new robustness available to all Turing computable processes, a new form of parallel computation, and a new class of general purpose analog computers. By embodying a new computational paradigm, the present invention not only provides computational strengths in areas previously the domain of living information processing systems, but also promises to generalize all of traditional computer science by solving the long-standing problem of literal-mindedness and brittleness in all computing systems.

Implications are broad and far-reaching as well as direct and immediate. This technology holds promise for immediate breakthrough caliber results not only in computer science, but in the understanding of living information processing systems. Contributions can be expected in fields that include neurophysiology, neuroanatomy, and biochemistry. This technology also holds promise for significant new results in many other fields, including mathematics, psychology, and even sociology.

BRIEF DESCRIPTION OF THE DRAWINGS

FIG. 3 shows a complete C code module that exemplifies the elements of a corob memory system of the present invention.

FIG. 4 is a schematic drawing illustrating the major components of the corob cell of the present invention.

FIG. 5 exemplifies, in a C header file, the structure and functional prototypes of the corob cell of FIG. 4, according to the preferred form of the present invention.

FIG. 6 exemplifies, in a C function, the procedure for creating and initializing a state, according to the preferred form of the present invention.

FIG. 7 exemplifies, in a C function, the procedure for creating and initializing a corob, according to the preferred form of the present invention.

FIG. 8 exemplifies, in a C function, the procedure for creating and initializing a cell, according to the preferred form of the present invention.

FIG. 9 exemplifies, in a C function, the procedure for loading the input register 40 of a cell of FIG. 4. with a corob, according to the preferred form of the present invention.

FIG. 10 exemplifies, in a C function, the procedure for loading the output register 46 of a cell of FIG. 4 with a state, according to the preferred form of the present invention.

FIG. 11 exemplifies, in a C function, the procedure for loading a new entry into the corob_memory 44 of a cell of FIG. 4, according to the preferred form of the present invention.

FIG. 12 exemplifies, in a C function, the preferred procedure for executing the corob cell to compute a new value for the output register 46 of FIG. 4 from the corob in the input register 40 of FIG. 4 and the current contents of the corob memory 44 of FIG. 4, according to the preferred form of the present invention.

FIG. 13 exemplifies, in a C function, the procedure for computing the metric from one corob to another, according to the preferred form of the present invention.

FIG. 14 presents, in C code, a concrete example of the use of the functionalities of the corob cell architecture.

FIG. 15 is a schematic drawing illustrating the major components of a corob computing system of the present invention.

FIG. 16 exemplifies, in a C header file, the structure and functional prototypes of the corob computing system of FIG. 15, according to the preferred form of the present invention.

FIG. 17 exemplifies, in a C function, the procedure for creating and initializing the storage for holding a column of the map 50 of FIG. 15 and for holding similar map data, according to the preferred form of the present invention.

FIG. 18 exemplifies, in a C function, the procedure for creating and initializing the storage for holding a corob computing system of FIG. 15.

FIG. 19 exemplifies, in a C function, the procedure for executing one internal iteration of the corob computing system of FIG. 15.

FIG. 20 comprises the first of three parts of a complete example of the use of the functionalities of the corob computing system of the preferred form of the present invention, including specification of programmatic code for the architecture phase of this corob computing system example.

FIG. 21 comprises the second of three parts of a complete example of the use of the functionalities of the corob computing system of the preferred form of the present invention, a specification of the procedure that is used to load a corob into the sensor cells 54 of FIG. 5.

FIG. 22 comprises the third of three parts of a complete example of the use of the functionalities of the corob computing system of the preferred form of the present invention, the control program for this corob computing system example.

Figure 1:
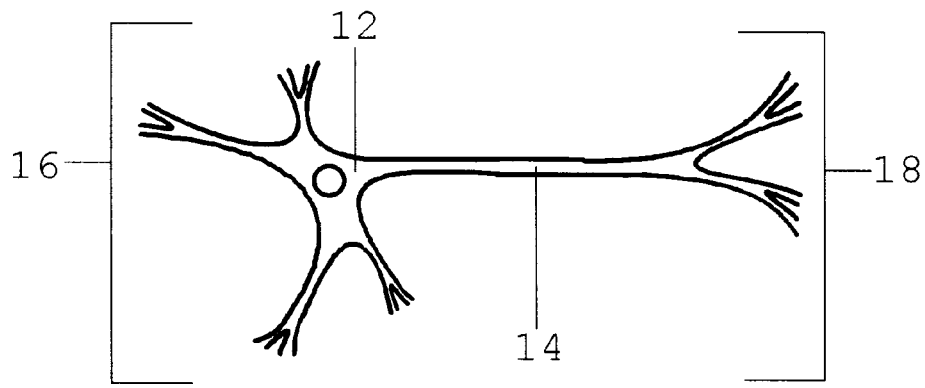
FIG. 1 is a schematic representation of a living neuron.

REFERENCE NUMERALS IN DRAWINGS 12 cell body 14 axon
16 input dendritic tree 18 output dendritic tree
20 first input neuron 21 input neuron set
22 second input neuron 24 last input neuron
26 neuron 28 output data line
40 input corob register 42 control element
44 corob memory 46 output state register
50 array of corob cells 52 map
54 sensor cells 56 actor cells

DETAILED DESCRIPTION OF THE PREFERRED EMBODIMENT

The following detailed description will permit a more complete understanding of this invention. However, the embodiment described below is simply an example of the invention, and the invention is not limited to this embodiment. It will be understood that the architecture of the present invention may be implemented with the use of various configurations of processors with appropriate modification. Accordingly, the specific configuration of the processor hereinafter described provides a non-limiting example of one implementation of the present invention. It will be further understood, that in certain instances, details may have been omitted which are not necessary for an understanding of the present invention.

Glossary of Terms

For ease of reference, terms as defined for use in describing the present invention are set forth below. As will be evident to those skilled in the art, the definitions incorporate both current standard meanings as well as extended meanings as prove necessary. They include the following:

action potential: a pulse in the axon of a living neuron actor: a short-hand term for "actor cell." Actor cells provide means by which external means can read data from a corob computing system.

animal intelligence: the functionality of a living information processing system architecture, architecture phase: in a corob based computing system, the process of specifying which of the corob cells, if any, are designated as sensor cells, which are designated as actor cells, and which of the corob cells supply input to which of the corob cells association: a pairing of a corob in a space with an arbitrary, but specific data object, typically within a corob memory system bounded space: a multidimensional cube or hyper-rectangle capacity (of a corob system): the number of equidistant corobs the system can host without degrading the overall equidistance of the system beyond a given degradation factor Cartesian distance metric: the square root of the sum of the squares of the differences in each dimension between the two corobs, suitably extended to deal with the fractional nature of the dimensions of corob generalized sub-spaces cell, corob cell: a corob based model of a living neuron, an architectural construct of the present invention corob: the primary token of data representation and manipulation in corob systems. The term Corob is a contraction of the words CORrelithm OBject, because a corob is a correlithm object. A point in a generalized sub-space of a particular space. Also, an architectural construct, a corob data area, of the present invention suitable for containing the data of a corob, where usage is clear from context.

corob computing system data area: an architectural construct of the present invention suitable for containing the data of a corob computing system corob cell data area: an architectural construct of the present invention suitable for containing the data of a corob cell corob data area: an architectural construct of the present invention suitable for containing the data of a corob corob memory system: a memory system in which corobs in a space are paired with arbitrary, but specific data objects in an association, so that the corobs might represent the associated arbitrary data objects, an architectural construct of the present invention corob memory system data area: an architectural construct of the present invention suitable for containing the data for a corob memory system corob metric: a metric that, when applied to measure the distance from a corob to another corob of the same space, results in a distance that is monotonically related to the distance produced by the Cartesian metric in the same direction between the same two corobs. A corob metric may be implemented by a neural network.

corob system, corob computing system: a computing system, based on corob cells, that may or may not be Turing Complete, an architectural construct of the present invention corob system architecture: the structures, functionalities, and other relevant details of systems that employ corobs as means for data representation or manipulation correlithm [comb. CORRELation+algorITHM]: any systematic method for solving problems by using similarities to known examples. Traditional information processing systems are strong in algorithmic, or procedure oriented, computation; living information processing systems are strong in correlithmic, or analogy oriented, computation.

current corob: the corob currently present in the input register of a corob cell; the corob that the corob cell matches against its corob memory definite corob: a corob whose elements are set by other than a random process. Definite corobs typically arise from considerations of external sensors and actors.

degradation factor: a specified number, a deviation from the property of equidistance in a corob system, that is reached when a number of equidistant corobs equal to the capacity of the system have been added to the system domain: set of cells that provide input education, education phase: in a corob based computing system, the process of installing appropriate data consisting of corob and state pairings, into the various corob memories. The term, static education, implies the one-time initialization of corob memories, typically during the education phase, while the term, dynamic education, implies a process of allowing the corob based computing system to decide for itself, in an automatic fashion, what data, consisting of corob and state pairings, is appropriate to store into the various corob memories, typically during the operation phase.

element (of a corob): A corob is a vector of elements. The elements can be individual numbers of any kind, including 1-bit binary numbers, natural numbers, integers, real numbers, complex numbers, and so forth, or the elements may be more complex, involving pairs of numbers, groups of numbers, or other data objects.

environment function: whatever functionality accepts data from actor cells of a corob system, processes it, and presents data to sensor cells of a corob system.

equidistance: a property among otherwise unrelated corobs of a particular space. If it is true that the orders of the generalized sub-spaces of these corobs are all roughly the same, then the Cartesian distance metric tends to be reflexive, and the distance measured by the metric from any one of these corobs to any other tends strongly to be standard distance. In this case, the corobs involved are said to be "equidistant."

execution: with reference to a corob cell, the process of generating a new value in the cell's output state, in light of the current contents of the cell's input corob and the cell's corob memory. This can be done by interpolation, as in the preferred form of the invention, or by use of any traditional artificial neural network. What is important is the use of corobs and the necessary functionality, not the specific means, which have many equivalents.

full set of cells, full set: in a corob based computing system, the complete complement of corob cells that are available to the system, namely, all internal cells generalized sub-space: a sub-space S1 of a space S2 consisting of all of the dimensions of S2, each weighted by some fraction between 0.0 and 1.0 inclusive host space: the particular space in which the generalized sub-spaces are defined that hold the points representing corobs; more conversationally, the particular space in which a given set of corobs is defined input cell: any of the corob cells of a corob based computing system that are designated to be sensor cells internal cell: in a corob based computing system, any of the complete complement of corob cells that are available to the system learning: with reference to a corob cell, the process of updating the cell's corob memory with an association of the cell's input corob with the cell's output state. Note that learning in this context can be accomplished by utilizing the learning mode of any traditional artificial neural network. It is the use of corobs and the functionality of the corob memory that is important to corob systems.

living computing system: another term for a living information processing system living information processing system: that portion of a living system that is deemed to process information living intelligence: the information processing capabilities of living neural systems living neuron: a building block of a living information processing system mechanism (as in a corob mechanism): a process or procedure that is uniquely well suited for implementation in corob computing systems; mechanisms are the analogs in corob computing systems to programs in traditional computing systems metric: a consistent means, formula, or yardstick of measurement; a metric is a consistent mathematical basis for measurement of some quantity operation, operation phase: that portion of the programming and use of a corob based computing system comprised of an ongoing iteration of the components of the system. The operation phase in corob computing systems is comparable to the ongoing execution process of traditional computing systems.

order (of a generalized sub-space): the sum of the weighting fractions of the sub-space output cell: any of the corob cells of a corob based computing system that are designated to be actor cells random corob: A corob for which the point it represents, and possibly its sub-space, if any, are chosen at random. More generally, a corob whose elements are largely uncorrelated among themselves, especially over time.

random state: a state whose internal value or values are selected at random random walk: any statistical process that produces a sequence of numbers where sequence proximity implies increased correlation reflexive (property): a mathematical concept concerning an operator, such as the "=" sign, whereby A=B implies B=A and conversely. The Cartesian distance measure is not intrinsically reflexive, although see equidistance.

scalar gravity: an interpolation method; a method of weighting elements of an interpolated value by the inverse squares of the metric distances of example points. So-called because of the analogy of the method to the fall-off of gravitational force with the square of distance and the absence of directional or vector information about that force. Scalar gravity produces interpolation results very similar to those that can be obtained from a wide range of so-called "neural network" methods of interpolation.

sensor: a short-hand term for "sensor cell." A sensor cell may have its state value set or influenced by means that are external to the corob computing system. Sensor cells provide means by which external data can be brought into a corob computing system.

significance: name commonly given to the weighting fraction in each dimension of a generalized sub-space of a space space: a geometrical object consisting of zero or more dimensions standard distance: the expected distance, typically expressed in terms of numbers of standard deviations, from a corob chosen at random to another corob chosen at random, within a space state: a single element of a corob state data area: an architectural construct of the present invention suitable for holding the data of one dimension of a corob string corob: if a list of otherwise random corobs is generated in a way that meets the condition that corobs closer together in the enumerative order of the list of corobs are also closer together under the applied distance metric, and conversely, corobs further apart in the enumerative order of the list of corobs are also further apart under the applied distance metric, then the list as a whole is referred to as a "string corob"

sub-space: a space S1 that is comprised exactly of some or all of the dimensions of another space S2, as in "S1 is a sub-space of S2"

threshold model: traditional model of a living neuron

Turing complete: a term applied to any computing system that can compute any computable function, subject only to the limits of time and storage capacity weighting fraction: in a generalized sub-space, a number between 0.0 and 1.0 inclusive, that indicates the degree of participation of a particular dimension of the sub-space in the corresponding dimension of the containing space Introduction To understand the present invention, it is necessary to understand the corob system architecture. To understand the corob system architecture, it is necessary to understand the cell, a fundamental building block of the corob system architecture. To understand the cell, it is necessary to understand the corob, the primary token of data representation and manipulation in corob systems. To understand the corob, it is necessary to understand the model of living neural systems from which the corob, and corob systems architecture, was derived. I will therefore deal with these issues in reverse order, beginning with living neural systems.

Living Neural Systems

A simplified schematic representation of a living neuron that will be familiar to those skilled in the art is presented in the drawing of FIG. 1. The living neuron of FIG. 1 is comprised of at least a cell body 12, an axon 14, an input dendritic tree 16, and an output dendritic tree 18. The living neuron of FIG. 1 is apparently a device that accepts input in some manner from other living neurons through its input dendritic tree 16, converts that input into a state variable through a poorly understood process, impresses that state variable as a signal onto the axon 14 which conducts it to the output dendritic tree 18 and thence to the input dendritic trees of other living neurons.

The traditional model of a living neuron is called the "threshold model." In the threshold model, a weighted sum of the input signals in the input dendritic tree 16 is formed, then compared to a threshold. If the weighted sum exceeds the threshold, then a pulse, called an "action potential," is impressed on the axon 14; otherwise, no action potential is produced. If an action potential is produced, it is conducted by the axon 14 to the output dendritic tree 18, where it is presented as input to other living neurons.

The presence or absence of an action potential in the axon 14 of the living neuron of FIG. 1 is traditionally considered to describe the state of the living neuron of FIG. 1.

Enormous effort has gone into the biochemical and neurophysiological understanding of the functioning of living neurons. The traditional threshold model persists today as one of the primary models for describing living neuron functionality.

In 1968, in an undergraduate thesis at the Massachusetts Institute of Technology, I described an alternative model of the living neuron. The details of this alternative model are unimportant for the understanding of the present invention, except for one point. In this alternative model, the rate of action potentials in the axon 14 comprised the state variable for the living neuron. The rate of action potentials, as determined by their spacings between action potentials, in a standard fashion that will be familiar to those skilled in the art of modulation theory, was taken as a kind of pulse position modulation, a continuous state variable very different from the discrete state variable implied by treating each action potential individually, as is done in the traditional model.

I went on to show in that undergraduate thesis that my alternative model of the living neuron could duplicate all functions provided by the traditional model of the living neuron. While my alternative model introduced no fundamentally new capabilities, it did provide a new perspective on neuron functionality that facilitated the understanding and description of continuous functions in living neural systems, such as the proportional control of muscles.

In the present invention, the cell, which will be described shortly, functions as an analog to the living neuron. In accordance with my alternative model of the living neuron, the state of the cell shall be taken to be a continuous variable. Living neurons exhibit a minimum and a maximum action potential rate. Accordingly, I limit the range of the continuous variable that is the state of the cell. It is convenient, and results in no loss of generality, to take this range to be the range of 0.0 to 1.0, inclusive of both 0.0 and 1.0 as well as all values in between. The value 0.0 represents the minimum state value of the cell, while the value 1.0 represents the maximum state value of the cell.

It should be noted that while the preferred embodiment of the present invention provides that the state variable of a cell be allowed to take on any value in the range just described, it is sometimes useful to limit the allowed values to a specified number of discrete values. If the state variable is represented by an inherently continuous physical property such as voltage, then the state variable will be similarly continuous. If the state variable is represented as a data element in a software program, for example, then it may be more discrete. For example, a floating point quantity has a finite number of distinct representations within a given digital computer. An integer quantity typically has even fewer distinct representations in a given digital computer than does a floating point number. These are both useful data types for representing the state variable. In some cases, a binary form is also useful, in which the state variable can take on one of only two values, 0 and 1. Typically, more discrete representations of the state variable will provide faster execution in digital computers. Of course, direct representation of the state variable by an inherently continuous physical property such as voltage may in fact provide faster execution than any digital implementation, depending on the specifics of the implementation.

Corobs

The corob is the primary token of data representation and manipulation in a corob system. Corobs were derived from study of living information processing systems. A simple mathematical model revealed some unexpected properties. It is these properties on which the present invention is based.

Referring again to FIG. 1, the living neuron of FIG. 1 takes input from other living neurons through its input dendritic tree 16. Presumably the input value supplied by any of the input neurons is the state value of that neuron. As previously stated, I will take such state values to be continuous variables in the range 0.0 to 1.0 inclusive.

Figure 2:
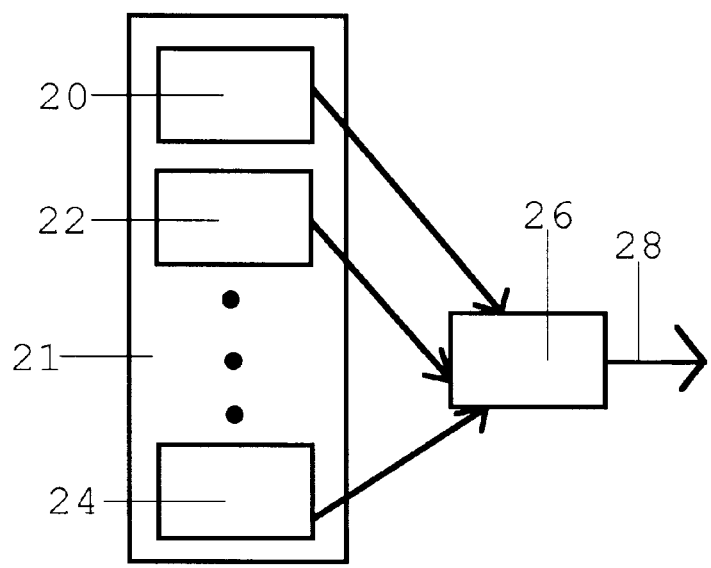
FIG. 2 is a schematic representation of the arrangement whereby neurons supply their state variables to a single neuron.

The arrangement among these neurons can be represented schematically as in FIG. 2. The input neuron set 21 is comprised of a plurality of individual neurons, shown schematically as neurons 20, 22, and 24, with additional neurons not shown but indicated by the three vertical dots in the input neuron set 21. Each of the neurons in the input neuron set 21 provides its state variable to the neuron 26, which processes these state variables in a manner to be describe later to produce its own state variable as output on the line 28.

In the absence of additional information, the state variables of the neurons of input neuron set 21 can be considered to be independent in the statistical sense. It is likely in living neural systems that relationships in fact exist among the neurons of input neuron set 21 that are not shown in FIG. 2, but as a first approximation, statistical independence is a reasonable assumption. Even if statistical independence is not perfect, as long as statistical independence of the state variables in the input neuron set 21 is more true than not, the useful properties of corobs can be established. In fact, many of the useful properties of corobs may established even if the state variables of the input neuron set 21 are deliberately set to specific values by human hand. The properties of corobs used by the present invention are very robust.

To understand what these properties of corobs are, how they come about, and indeed what exactly the term "corob" describes, consider the state variables of input neuron set 21 as a vector of numbers all in the range between 0.0 and 1.0 inclusive. These state variables of input neuron set 21 can equivalently be described as a multidimensional unit cube. A particular vector, that is, a vector that contains particular values in each of its elements, can then be equated to a single mathematical point in the multidimensional unit cube. The term "bounded space" can alternatively be used to describe a bounded multidimensional region, where each dimension has a high and low bound, such as the multidimensional unit cube just described. As long as the bound on each dimension of the space is understood, the term "space" can be used in place of "bounded space."

An additional term I will need is the term "sub-space," which is a space comprised exactly of some or all of the dimensions of another space. Note that a sub-space S1 of space S2 may consist of exactly all of the dimensions of S2, or only some of them. If it consists of all of them, then it is correct to say that "S1 is a sub-space of S2" or "S2 is a sub-space of S1": the spaces S1 and S2 are identical. If S1 consists of fewer dimensions than S2, then SI is a sub-space of S2, but S2 in not a sub-space of S1.

A generalization of the term "sub-space" is needed here, one that is not normally used much in traditional work with spaces, although it is known to those skilled in the art. Normally, each dimension of a space S2 is either a dimension of the sub-space S1, or it is not. In other words, it is a binary decision whether or not a given dimension of S2 is present in S1: it either is, or it is not. A generalization of this allows fractional participation of dimensions of S2 in S1. As a concrete example, suppose that S2 consists of ten dimensions, numbered 1 through 10. In a binary case, sub-space S1 could be defined to be exactly those dimensions of S2 numbered 1 through 5. In the more general fractional case, this situation would be described by saying that S1 consists of dimensions 1 through 5 each weighted with the fraction 1.0, and dimensions 6 through 10 each weighted with the fraction 0.0. In other words, in the more general sense, the sub-space S1 consists of all of the dimensions of S2 at some fractional weighting between 0.0 and 1.0, inclusive. As an additional example, it would consistent under this generalization to describe a sub-space S3 of space S2 where dimensions 1 through 3 are weighted with the fraction 1.0, dimensions 4 through 7 are weighted with the fraction 0.5, and dimensions 8 through 10 are weighted with the fraction 0.0. This generalization of the concept of sub-space is necessary to describe the preferred embodiment of the present invention.

A "corob" can now be defined as a point in a generalized sub-space of a particular space.

The "order" of a generalized sub-space is defined to be the sum of the weighting fractions. If all such fractions are either 1.0 or 0.0, then this definition is consistent with more familiar meanings of sub-space order, namely the number of dimensions.

Corobs of all dimensionalities are useful, although a tradeoff is involved. Corobs of smaller dimensionalities have reduced storage and processing requirements, but also result in weaker corob properties than may be needed for a specific application, while corobs of larger dimensionalities will provide properties strong enough for most any requirement, at a cost of increased storage and processing requirements. Corob dimensionalities less than five have limited utility. Corob dimensionalities in the range of 50 to 100 have been employed successfully for a wide range of applications. Dimensionalities higher than 100 are useful for complex situations.

The next concept I will need, to continue with the description of the nature of corobs, is the concept of a distance metric between corobs. The term "metric" describes a very broad and wide ranging concept in science, a consistent means, formula, or yardstick of measurement. A full, formal description of the term "metric" will not be needed here. Informally, a metric is a consistent mathematical basis for measurement of some quantity.

The quantity that must be measured is the distance between two corobs. One of the simplest forms of metric which is satisfactory for this purpose is called the "Cartesian distance" metric, which is defined as the square root of the sum of the squares of the differences in each dimension between the two corobs, with suitable extensions added to deal with the fractional nature of the dimensions of corob generalized sub-spaces. The Cartesian distance metric is the metric of choice in the preferred form of the present invention. Many other metrics can also be employed for this purpose. The requirement is simply that application of the chosen metric to pairs of corobs must result in the corob properties to be discussed shortly. Usually any functional form of metric will do that, when applied to measure the distance from one corob to another corob of the same space, results in a distance that is monotonically related to the distance produced by the Cartesian metric distance in the same direction between the same two corobs. This description of the class of metrics appropriate for use with corobs and corob systems will be clear to anyone skilled in the art of mathematical metrics.

The preferred form of the Cartesian distance metric to obtain a measure of the distance from corob C1 to corob C2, as extended for current purposes, is defined as follows. Suppose S1 and S2 are generalized sub-spaces of space S. Suppose that two corobs, C1 and C2, are defined in S1 and S2, respectively. Consider C1. According to the definitions, in each dimension, i, of the N dimensions of S, where i takes on all integer values from 1 to N, C1 will have a point value, $v1_i$, between 0.0 and 1.0 inclusive and an associated weighting fraction or "significance," $s1_i$, that is also between 0.0 and 1.0 inclusive. Similarly, C2 will have the value, $v2_i$, in each dimension, i. For each dimension, i, form the difference term, $x_i$, as $(v2_i-v1_i)$. Then sum the product, $(s1_i*x_i*x_i)$, over i and take the square root of the overall sum. The result is the preferred form of the Cartesian distance metric for the present invention, although as previously noted, many other metrics can also be used in its place.

Note that this definition involves the sub-space dimension significances or weightings of corob C1, but does not involve those of C2. This non-reflexive metric definition results from dealing with sub-spaces S1 and S2 that are not identical. It is quite intuitive when examined closely.

First, consider the case where all "s" values of corob C1 in S1 are either 1.0 or 0.0. For dimensions where this "s" value is 1.0, the term $(s1_i*x_i*x_i)$ becomes simply $(x_i*x_i)$, or the square of the difference in that dimension. Where this "s" value is 0.0, the term becomes zero. The square root of the sum of these terms is then simply the familiar multi-dimensional Cartesian diagonal.

If S2 is identical with S1, then C1 is compared to a well-defined point in C2, since all of the fully valid (or $s1_i=1.0$) dimensions of C1 are the same as all of the fully valid (or $s1_i=1.0$) dimensions of C2. If in fact C2 is the same identical corob as C1, which means that both the sub-spaces S1 and S2 are the same and both the points C1 and C2 are the same within those sub-spaces, then the application of the metric results in a distance of 0.0, the minimum distance possible between two corobs.

If for every fully valid ($s1_i=1.0$) dimension of C1, the corresponding dimension of C2 is fully invalid ($s2_i=0.0$), then the point represented by corob C1 lies in a sub-space S1 that is disjoint from the sub-space S2 and consequently from the corob C2. The corob C1 will therefore be compared against whatever values may appear in the values of C2 of the corresponding, but invalid, dimensions of S2. This may appear at first glance to be nonsense, but it is actually quite valuable, as will be shown shortly. It results in a distance metric whose value is approximately "standard distance," an important property of corobs.

All other applications of the metric to obtain a measure of the distance from C1 to C2 involve cases where some or all of the "s" values of either S1 or S2 are not precisely 1.0 or 0.0.

To understand why the metric is defined in this way, the statistics of the metric must be examined.

Suppose that in a space S, a large number of corobs are defined. Let the sub-spaces and points represented by these corobs be chosen at random. Select any one of these corobs, for example, corob C1. Let the preferred Cartesian distance metric be applied from C1 to each of the other corobs and let a mean and standard deviation of the resulting distances be computed. It can be shown both by direct computation and by mathematical analysis that the ratio of this mean to this standard deviation grows monotonically as the number of dimensions of S is increased. This ratio expresses the mean or expected distance between two randomly chosen corobs in terms of some number of standard deviations. Even for relatively small spaces, consisting of perhaps some tens of dimensions, the expected distance is several standard deviations. For spaces of 50 dimensions, the expected distance is about nine standard deviations, while for spaces of 100 dimensions, the expected distance is about 13 or 14 standard deviations. The number of standard deviations is approximately proportional to the square root of the number of dimensions in the space, S.

Given such large statistical separations between corobs chosen at random, it seems natural to ask if the distributions they imply hold up under experiment. They do. I have run the experiment described for spaces of up to 1000 dimensions and more, for literally millions of corobs in the large group. The statistical distribution of distances between the test corob and the rest of the large group of corobs closely follows a curve completely consistent with the expectations that the concepts of mean and standard deviation produce. Even for relatively small spaces, it is exceedingly unlikely that two corobs chosen at random will lie very close together under the metric.

I discovered these statistics while running computer simulations of plausible, simple models of living neurons. The implications of this discovery are enormous, and lead directly to the present invention.

The first implication of my discovery is the fact that it leads directly to a plausible data token for the representation and manipulation of information in living neural systems, namely corobs chosen at random, consisting of the states of a set of living neurons. Corobs are widely separated, according to my discovery, so any time a living neuron sees a corob in its input dendritic tree that is near, compared to the expected number of standard deviations between such corobs, to a corob it has seen before, it is unlikely to be an accident. The nearer is the distance, the less likely it is to occur by chance. If living neurons can somehow store previous corobs associated with the state value of the living neuron at the time each previous corob was seen, then the current state of the living neuron can be made to reflect that previous state. Moreover, if the usual state of the living neuron is some kind of continuous random variable, such as a simple random walk, then the distance measure can be made to control the distribution of the continuous variable around the previously stored state value, so that the smaller the distance, the less random deviation there is in the current state variable from the previously stored state variable.

A simple mechanism exists and can be demonstrated to produce this behavior in living neural systems. I believe that it is the fundamental data processing principle to be found in living neural systems, a principle that has long eluded researchers.

The concepts of corobs can be extended to model many other situations. For example, consider a human society. Model the society such that each individual is made analogous to a living neural cell. Group dynamics can then be described in terms of corobs comprised of individuals, where each individual has a state and a group of other individuals on which the individual's state depends. A consensus opinion then becomes simply a dominant corob within the group.

The expected distance, typically expressed in terms of numbers of standard deviations, from a corob chosen at random to another corob chosen at random within a space, is typically referred to as "standard distance." Standard distance is an unexpectedly large number of standard deviations for corob systems of all dimensionalities, and standard distance tends to grow proportionately to the square root of the number of dimensions in the space in which it is defined.

The property of standard distance leads immediately to two more important properties of corob systems, equidistance and capacity.

If it is true that the orders of the sub-spaces in which the otherwise unrelated corobs of a particular space are defined are all roughly the same, then the metric tends to be reflexive, and the distance measured by the metric from any one of these corobs to any other tends strongly to be standard distance. In this case, the corobs involved are said to be "equidistant," and the corobs involved, considered as a group, have the property of "equidistance."

The "capacity" of a corob system is the number of equidistant corobs it can host without degrading the overall equidistance of the system beyond a specified number, called the "degradation factor." Obviously, the degradation factor and the capacity of a corob system have a functional relationship.

The intrinsic, robust, and large equidistance of otherwise unrelated corobs of similar sub-space orders all defined within the same space gives rise to the enormous corob capacities to be found in such spaces. As the dimensionality of the host space increases, the capacity of the corob system it hosts approaches the number of distinguishable states of the system. The larger the degradation factor, the more this is so, but the large size of the standard distance supports substantial degradation factors.

Exceeding the capacities of small corob systems within a living system may be one mechanism that gives rise to "flashes of insight" or "sudden inspirations," as corobs that normally would not be added if the system's capacity were not being exceeded find themselves unusually near other stored corobs as a result of being statistical outriders.

A special case of the generic concept of the corob is the "string corob." If a list of otherwise random corobs is generated in a way that meets the condition that corobs closer together in the enumerative order of the list of corobs are also closer together under the applied distance metric, and conversely, corobs further apart in the enumerative order of the list of corobs are also further apart under the applied distance metric, then the list as a whole is referred to as a "string corob." Meeting this condition, and as a result producing a string corob, is quite easy and can be done in a variety of ways. First, the first corob in the string corob list is generated by selecting random values for its elements. The second corob in the string corob is then generated by applying some form of the classical statistical process called the "random walk" to some or all of the elements of the first corob. This process is continued recursively, in each case generating the next corob in the string corob list from the current corob by applying a random walk.

A random walk is any statistical process that produces a sequence of numbers where sequence proximity implies increased correlation. For example, the following C code fragment will illustrate one means for producing a random walk.

```
1 int i;
2 double list[100];
3 double fraction = 0.1;
4 ...
5 list[0] = (double) random( ) / (double) LONG__MAX;
6 for (i=1; i<100; i++) {
7   list[i] = list[i−1] +
8   fraction * 2.O * (((double) random( ) / (double) LONG__MAX) − 0.5);
9 }
```

In this C code fragment, line numbers have been added to aid discussion. This will be done throughout this narrative whenever necessary.

Line 1 of this C code fragment defines storage for the integer loop control variable that will be used later on. Line 2 defines storage for the list of double precision numbers that will be generated and will comprise the random walk. Line 3 defines storage for the double precision fraction that will be used to control the random walk calculation, and sets it to the value 0.1. Line 4 contains an ellipsis that serves here to indicate that other C code would be necessary in an operational environment to make this C code fragment actually execute. It will be obvious to those skilled in the art of writing C code programs what else is needed in any given situation of compiler and computer system. Line 5 establishes the first element of the random walk list as a double precision pseudo-random number between 0.0 and 1.0. The function "random()" in line 5 is a standard C library function that returns a pseudo-random integer between 0 and predefined constant value, LONG__MAX. Dividing by LONG__MAX here in a double precision calculation results in the desired bounded pseudo-random double precision number. Lines 6 through 9 compute the rest of the random walk list. Line 6 specifies that the loop run for 99 more iterations. Lines 7 and 8 constitute a single C code assignment statement that assigns to the "ith" element of the list a value that is computed from the "(i-1)th" or previous element of the list. The ith list element will be the value of the (i-1)th list element plus a number between +fraction and −fraction that is computed in line 8.

The result of this C code fragment will be a sequence of otherwise random numbers with the property that adjacent elements in the list never vary by more than plus or minus the value of fraction. Elements further apart in the list may vary by more. This meets the requirements laid down for a random walk.

To generate a string corob, apply a random walk process to successive corresponding elements in the list of corobs so that within a given corob, the elements of that corob are random with respect to one another, but corresponding elements in the sequence of corobs are produced by a random walk.

String corobs are extremely useful in the pattern recognition of sequences. When a sequence of random corobs must be stored in a manner that supports recognition of the sequence as a whole or components of the sequence, the sequence can be paired corob by corob with the corobs from a generated string corob. The resulting list of paired corobs retain the random corob values of the sequence to be recognized as well as the properties of the string corob. This establishes an order in the list, somewhat akin to numbering the original sequence of random corobs. This construct supports a corob mechanism that can be used to identify and also to reconstruct the original sequence.

It should now be clear that although I have described a preferred form for corobs, corobs are in fact very generic things. A corob is a vector of elements. The elements can be individual numbers of any kind, including 1-bit binary numbers, natural numbers, integers, real numbers, complex numbers, and so forth, or the elements may be more complex, involving pairs of numbers, groups of numbers, or other data objects. The thing that makes them corobs is the existence of a distance metric that can be monotonically related to the Cartesian distance metric I have defined which, if one applies the metric repeatedly to measure the distance between pairs of a large number of corob candidates, then computes a mean and standard deviation of the resulting values, one obtains a mean whose magnitude is significantly larger than the magnitude of the standard deviation so obtained. The major discovery that I have made, and the one that makes corob computing systems so generic, is that this defining characteristic is readily obtained in a very broad number of ways. In particular, it arises from almost any process that treats elements of each candidate corob independently of most of the other elements of that same corob, even if the independence is only approximate.

The statistics of corobs, even moderately sized corobs, insure that corobs will be equidistant within their space, and widely separated statistically. This makes them ideal data tokens for representing and manipulating information.

Corobs and Corob Memory Systems

The first application I will show for corobs is the corob memory system, in which corobs in a space are associated with data objects so as to represent them.

FIG. 3 shows a complete C code module that implements the elements of a corob memory system of the present invention. The lines of the C code have been numbered to simplify discussion, but the C code should otherwise be fully functional when presented to one of today's ordinary C compilers. The code of FIG. 3. (and all C code in this disclosure) was in fact tested under the GNU GCC compiler.

The C code in FIG. 3 shows four functions and a typedef for the new data type, COROB, in the preferred form.

Lines 1 through 4 of FIG. 3 specify standard C header files that are found in every complete, current day C compiler. The file, stdio.h, in line 1 provides support for standard C input and output. The file, stdlib.h, in line 2 provides support for standard C utilities, such as the random number generation function used in lines 33 and 34. The file, math.h, in line 3 provides support for mathematical functions, such as the square root function in line 44. The file, limits.h, in line 4 provides definitions of constants, such as the constant, LONG_MAX, found in lines 33 and 34.

Lines 6 and 7 define some of the operating characteristics of the corobs that will be defined and manipulated in this C code. The local constant, NBR_OF_DIMS, is defined in line 6 to be 100, and represents the number of elements that will be present in each corob supported by this C code. The local constant, NBR_OF_COROBS, is defined in line 7 to be 1000, and represents the maximum number of corobs that this C code will support. While fully functional, this C code is intended primarily for illustration. In a more generic implementation, these constants would most likely be replaced by variables, to allow the user of this code more flexibility. How to do this will be obvious to those skilled in the art of C programming.

Line 9 through 12 define the nature of the corobs that this C code will support. The use of the C keyword, typedef, in line 9 causes the struct code that follows in lines 9 through 12 to be established as a new data type, to be called "COROB" as specified in line 12. Each such COROB will consist of two double precision arrays, both comprised of NBR_OF_DIMS elements, the val[] array defined in line 10, and the sig[] array defined in line 11. Each specific element of val[], such as val[1], has a corresponding element of sig[], in this case sig[1]. A val element together with a sig element with the same index comprise storage for an element of the corob. The val[] array is intended to hold value numbers that define the corob's coordinates, while the sig[] array holds significance numbers that define the corob's generalized sub-space in this preferred implementation. From this code, it should be obvious to those skilled in the art how to substitute other definitions of COROB here that are consistent with the theory of corobs already presented.

Line 13 creates an array of COROBs of length NBR_OF_COROBS for use by this corob memory system support code presented in FIG. 3. This array will hold all of the corobs for memory purposes that this C code supports. The index of this array functions as the data to be associated with each corob stored in the memory. This approach is in fact quite general, since these index numbers could be used in other code, such as a standard database management system, to serve as a lookup index for any type of data object that can be defined. So it is sufficient for purposes of illustrating how corob system memories can be built and used to associate index numbers with corobs as is done here.

The first function in the C code of FIG. 3 is given the name, assign_corob_to_index, in line 15. The function accepts one integer parameter, new_index, which is the index number of the corob[] array for which to define a corob. The function generates a new corob in corob[new_index], and returns the value, new_index, to the caller, or a −1 if there is an error. Line 16 checks to make sure that the value supplied by the caller in new_index is within the bounds of the corob[] array, and returns −1 if it is not. Line 17 calls the routine, generate_corob(), to actually produce the required corob, and specifies the address of corob[new_index] as the place to generate the new corob. The function, generate_corob(), is specified later in FIG. 3, and below.

Lines 21 through 29 define the next function, find_nearest_corob(), which accepts two parameters, a pointer to a double variable, distance, and a pointer to a COROB variable, c. The function accepts c as input and searches the corob[] array for the corob that is nearest to c, according to the distance measuring function, metric(), which will be defined shortly. The index of the nearest corob in the corob[] array is returned by this function, and that distance is stored in the memory location pointed to by the variable, distance. In line 23, the distance storage is initialized to NBR_OF_DIMS, which in this C code is guaranteed to be larger than any distance between two corobs computed by the function metric(). Then a loop is run in lines 24 through 27 that systematically computes the distance between c and each member of the corob[] array to find the minimum distance.

Lines 31 through 36 define the function, generate_corob(), which creates a new corob. The function accepts the address of a COROB storage area, c, in which to build the new corob. The loop in lines 32 through 35 does the construction work, storing pseudo-random numbers that lie between 0.0 and 1.0 into both the val[] and sig[] elements of c. The function, random(), used in lines 33 and 34, is a standard C utility function that returns an integer between the values of 0 and LONG_MAX. Dividing this integer by LONG_MAX in a double precision calculation produces the desired double precision pseudo-random number.

The C code of FIG. 3 contains a specific description of a corob data area, an architectural construct of the present invention suitable for containing the data of a mathematical corob for further use. This construct is itself sometimes also referred to by the word, corob, and it will be clear from context when the construct is the intended meaning of the word, corob, and when the mathematical or computational data object is the intended meaning of the word. The specific C code of FIG. 3 that describes the architectural construct has already been discussed above, and is comprised of lines 6 and 7 that define the constants, NBR_OF_DIMS and NBR_OF_COROBS, lines 9 through 12 that give a specific description of the architectural construct, called by the term, corob data area, or simply, corob, line 13 that describes how a plurality of corobs is comprised, and lines 31 through 36 that describe how to load the architectural construct, corob, according to the present invention.

The last function in FIG. 3 is metric(), defined in lines 38 through 45. It implements the preferred Cartesian distance metric, extended for use in generalized sub-spaces. It takes as input the addresses of three storage spaces, a double precision storage space called "distance" and two COROB storage spaces called by the names "to" and "from." The metric is computed from the "from" COROB to the "to" corob, as might be expected, and the result is returned in the storage space called "distance." The loop shown in lines 40 through 43 generates a sum comprised of terms. The terms are comprised of the squares of the differences between corresponding val[] elements in the "from" and "to" corobs, each multiplied by the corresponding sig[] term from the "from" corob. In line 44, the square root of this sum is taken, then stored into the storage space called "distance." Notice that if the sig[] term of the "from" corob is all of the value 1.0, then this C code simply implements the familiar Cartesian diagonal between two multi-dimensional points. It is deviations of the "from" corob sig[] array from all ones that causes this function to deal with generalized sub-spaces.

There is a trap hidden in the simple C code of FIG. 3, namely, what happens if the corob[] array is not completely filled with valid corobs? This case was not handled in order to keep this C code simple and illustrative. When the find_nearest_corob() function is called, comparisons are made by that function with whatever data might be present in the spaces reserved for corobs, regardless of whether portions contain valid corobs or not. In the examples that follow here, I will always fill the corob[] array completely, so the situation of comparing against non-valid corobs does not occur. However, a more general code can easily be built by those skilled in the art of C programming, for example by including a flag in the corob structure of lines 9 through 12 to designate whether or not the data in the corob is valid, and also including a test of that flag in find_nearest_corob(), to skip those cases in the corob[] array where corobs are not defined.

To illustrate the use of the corob memory system of FIG. 3, as well as some of the properties claimed for corobs, I will now present a couple of examples.

The first example shows that the C code of FIG. 3 can in fact be used to do what is claimed, namely to store and retrieve corobs and their associated indexes. The following C code must be linked with the C code of FIG. 3:

```
1 void main(void) {
2   int i, idx; double distance;
3   for (i=0; i<NBR_OF_COROBS; i++) {
4     assign_corob_to_index(i);
5   }
6   idx = find_nearest_corob(&distance, &corob[100]);
7   printf("nearest corob: idx=%d, distance=%f\n", idx,distance);
8 }
```

This C code provides a main() function, which creates a complete C program. Line 1 above begins the definition of the main() function. Lines 3 through 5 generate a valid corob in every member of the corob[] array of FIG. 3. In line 6, a particular corob is selected from this group, in this case corob[100], and presented to the function, find_nearest_corob(), which returns a distance and index for the nearest match. Line 7 prints results, which are:

nearest corob: idx=100, distance=0.000000

This is, of course, exactly what we should expect, since I am using one of the members of the corob[] array, corob[100], explicitly as the "from" corob, the one to find in the corob[] array. The returned index is 100, which is correct, and the returned distance is zero, which is also correct.

This example shows that the corob memory system is at least capable of finding one of its previously stored values correctly.

Next, let us consider what happens when a random corob is presented, instead of one taken from the stored set. The following C code must now be linked with the C code from FIG. 3:

```
1  void main(void) {
2    int i, idx; double distance; COROB c;
3    for (i=0; i<NBR_OF_COROBS; i++) {
4      assign_corob_to_index(i);
5    }
6    generate_corob(&c);
7    for (i=0; i<NBR_OF_COROBS; i++) {
8      metric(&distance, &corob[i], &c);
9      printf("%f\n", distance);
10   }
11 }
```

This C code defines a new main() function. Again, the corob[] array is completely filled. This time, in line 6, an additional corob, c, is generated, one that is presumably uncorrelated with all of the corobs in the corob[] array. Then in lines 7 through 10, the distance from c to each corob in the corob[] array is computed in turn and written to standard output. Computing some simple statistics on this standard output, the following results are obtained:

Number of dimensions: 100
Number of corobs in corob[] array: 1000

Mean of the distances: 2.747503

Standard deviation of the distances: 0.172003

Smallest distance: 2.121537

Using corobs with 100 dimensions or elements, and computing the metric from a corob to an array of 1000 corobs, the mean or average of the distances turns out to be about 2.75, the standard deviation of the distances is about 0.17, and of the 1000 corobs in the corob[] array, the nearest one to the test corob lies at a distance of about 2.12. Noting that a perfect match to the test corob would produce a distance of zero, we can conclude that the mean in this case is nearly sixteen standard deviations from a perfect match, and that the nearest corob to the test corob, c, in the list of 1000 corobs in the corob[] array is more than twelve standard deviations away.

By varying the constants, NBR_OF_DIMS and NBR_OF_COROBS, in lines 6 and 7 of FIG. 3, and recompiling, the following table can be prepared, which includes the case just discussed:

standard deviation and also appears to grow with the number of elements in the corobs. Thus the engineer will be able to find a useful, optimal point that minimizes corob size (and hence corob storage requirements and speed of execution) while maximizing corob separation (so that the required number of distinct corobs can be defined in the corob memory system), with a little computer experimentation of the type reflected in this table.

This table provides direct support for my claim that properly constructed corobs are approximately equidistant, and my claim that their separation increases dramatically as the size of the corobs increase. This directly supports the ability to store useful numbers of corobs unambiguously in a single corob space.

So far, I have discussed how a corob memory system can store and retrieve corobs exactly, and how the concept of equidistance can be demonstrated. Now I will illustrate the ability of a corob memory system to retrieve the correct corob even in the presence of considerable amounts of noise. Error detection and correction is, of course, a widely known

| NBR_OF_DIMS | NBR_OF_COROBS | Mean | Std | Min_dist |
| --- | --- | --- | --- | --- |
| 2 | 1000 | 0.392285 | 0.189023 | 0.020519 |
| 5 | 1000 | 0.539489 | 0.183610 | 0.129400 |
| 10 | 1000 | 0.819730 | 0.155148 | 0.249973 |
| 20 | 1000 | 1.391240 | 0.204310 | 0.720507 |
| 50 | 1000 | 2.100320 | 0.182717 | 1.415150 |
| 100 | 1000 | 2.747503 | 0.172003 | 2.121537 |
| 2 | 10000 | 0.277508 | 0 156763 | 0.001076 |
| 5 | 10000 | 0.465575 | 0.193268 | 0.047224 |
| 10 | 10000 | 0.853897 | 0.182998 | 0.294207 |
| 20 | 10000 | 1.158750 | 0.165408 | 0.576803 |
| 50 | 10000 | 1.924440 | 0.181519 | 1.249326 |
| 100 | 10000 | 2.907200 | 0.190585 | 2.141652 |
| 2 | 100000 | 0.350550 | 0.175555 | 0.000795 |
| 5 | 100000 | 0.609750 | 0.221049 | 0.031210 |
| 10 | 100000 | 0.933801 | 0.212999 | 0.188586 |
| 20 | 100000 | 1.344078 | 0.197490 | 0.482851 |
| 50 | 100000 | 2.191305 | 0.192943 | 1.335794 |

This table shows the resulting distance mean, standard deviation, and minimum distance or closest corob for corob[] arrays of 1000 corobs, 10000 corobs, and 100000 corobs. In each of those cases, corob sizes were defined of 2, 5, 10, 20, 50, and 100 dimenions, except in the last group of figures, where 100000 100-dimension corobs exceeded the capacity of my computer. These figures are considered representative of results to be obtained from corobs generally, although different algorithms for generating pseudo-random numbers in the function random() if FIG. 3, as well as different seed values for the random number generator, would cause variations in the exact values of the numbers. Varying the metric or varying the definitions of the corobs in terms of what kind of elements comprise them will also cause variations in details.

Some enlightening and practical things about corobs are suggested by this table. Notice first that the mean is larger, often many times larger, than the standard deviation. Even for tiny corobs of dimensions 2 and 5, the mean is two or more times the size of the standard deviation. For larger corobs, it can be ten or more times as large. Table suggests that larger corob systems, that is systems of corobs where the corobs have more elements, tend to produce larger ratios of mean to standard deviation. This is true in general. The column labeled "Min_dist" shows the distance of the corob[] array that is nearest the test corob. This distance ranges from essentially zero to many multiples of the and understood prior art, but error detection and correction technology has heretofore required very precise algorithms for the identification of tokens or regions of the error detection or correction space. Corob memory systems provides error correction capabilities that arise from the equidistance property of corobs, which means that the very simple, imprecise, random processes that underlie corobs can now replace the very precise error detection and correction algorithms. It appears astonishing that corob-oriented random processes lead directly to such error detection and correction capabilities, but perhaps it should not, given that corob memory systems appear to be a primary mechanism in the functioning of living neural systems.

To illustrate the functioning of a corob memory system in the presence of noise, we must link the following C code to the code of FIG. 3:

```
1   void main(void) {
2     int i, idx; double distance, fraction; COROB c;
3     for (i=0; i<NBR_OF_COROBS; i++) {
4       assign_corob_to_index(i);
5     }
6     for (fraction = 0.0; fraction <= 1.0; fraction += 0.1) {
7       for (i=0; i<NBR_OF_DIMS: i++) {
8         c.val[i] = (1.0 - fraction) * corob[100].val[i] +
```

```
9              fraction * ((double)random( ) / LONG_MAX);
10     c.sig[i] = (1.0 - fraction) * corob[100].sig[i] +
11              fraction * ((double)random( ) / LONG_MAX);
12   }
13   idx = find_nearest_corob(&distance, &c);
14   printf("fraction=%f, nearest corob: idx=%d, distance=%f\n",
15          fraction,idx,distance);
16   }
17 }
```

This main() function again fully fills the corob[] array in lines 3 through 5. The loop of lines 6 through 16 causes a variable, fraction, to iterate from a value of 0.0, which represents no noise, to a value of 1.0 which represents all noise, by increments of 0.1. The test corob, c, is generated in the loop of lines 7 through 12. If the variable, fraction, is set to 0.0, then the numbers placed into c by lines 8 through 11 will be exactly those of a specific member of the corob[] array, in this case corob[100]. If the variable, fraction, is set to 1.0, then the numbers placed into c by lines 8 through 11 will be purely random numbers. Intermediate values of the variable, fraction, will result in intermediate mixtures of corob[100] and random numbers. Thus the variable, fraction, controls the amount of noise present in c, compared to the corob in corob[100]. In lines 13 through 15, the nearest corob is found and the results are printed.

The constant, NBR_OF_DIMS, was set to 100 and the constant, NBR_OF_COROBS, was set to 1000, then the code was compiled and executed. Here is the output of this C code:

fraction=0.000000, nearest corob: idx=100, distance= 0.000000
fraction=0.100000, nearest corob: idx=100, distance= 0.312888
fraction=0.200000, nearest corob: idx=100, distance= 0.567366
fraction=0.300000, nearest corob: idx=100, distance= 0.904615
fraction=0.400000, nearest corob: idx=100, distance= 1.143004
fraction=0.500000, nearest corob: idx=100, distance= 1.495902
fraction=0.600000, nearest corob: idx=100, distance= 1.790914
fraction=0.700000, nearest corob: idx=100, distance= 2.038526
fraction=0.800000, nearest corob: idx=412, distance= 2.168306
fraction=0.900000, nearest corob: idx=425, distance= 2.224390
fraction=1.000000, nearest corob: idx=651, distance= 2.241238

In each line in this output, the fraction of the test corob, c, that is noise is shown, then the index and distance of the nearest corob. The first line, with fraction=0.0, shows that the nearest corob has an index of 100 and a distance of 0.0, which it should since the test corob, c is an exact copy of corob[100]. The last line, with fraction=1.0, shows the nearest corob to be 651 at a distance of about 2.24. Previously, for 1000 corobs of 100 elements each, we saw that the nearest corob in the corob[] array to the random test corob was at a distance of about 2.12. That previous case also noted a mean of about 2.75 and a standard deviation of about 0.17. Thus the numbers in the current case for a completely random corob, the fraction=1.0 case, do not appear unreasonable in light of the previously shown statistics for this type of case.

Notice that it is not until the variable, fraction, reaches 0.80, which corresponds to eighty percent random noise, that the wrong index is returned. This is an incredibly robust retrieval performance by any standard. That such robust behavior emerges from a corob memory system based on such simple statistical processes and metrics is totally unexpected, and in fact, nothing short of astonishing. The corob memory system aspect of corob computing systems of the present invention is therefore indeed novel, non-obvious, and very useful.

Corob Cells

Next, I take up the implementation of corob cells. I will elaborate the corob memory system slightly to produce a fundamental component of corob computing systems, the corob cell. From corob cells, a full corob computing system will be described shortly.

FIG. 4 is a schematic drawing illustrating the major components of the corob cell of the present invention. A register 40 provides storage for an input corob that is presented as input to the cell of FIG. 4. A control element 42 accepts an input corob from register 40 and directs the processing of that input corob. A register 46 provides storage for an output state. There are two modes of operation of the corob cell of FIG. 4, learning and execution. During learning, the input corob in register 40, together with the output state in register 46 are presented by the control element 42 to the corob memory 44, to be retained in an appropriate manner. During execution, the control element 42 accepts the input corob from register 40 and generates a new output state in register 46, taking into account the current state of the corob memory 44 and proceeding in accordance with the teachings of the present invention.

Note that under some circumstances, namely during the process of initializing or updating the corob memory 44, external processes can impose a current output value on register 46.

I will now present a detailed example of the structure and operation of the corob cell of FIG. 4. This example embodies the preferred form for the corob cell. However, the present invention teaches that the design and construction of corob systems involve many variables and decisions, and that there are wide latitudes available in setting these variables and making these decisions so that the precise choice, even in the preferred form, may not hold much advantage over other choices, and can even be somewhat inferior to other choices in a given set of circumstances. Also, this example is presented in the C programming language for convenience in expressing the concepts. As is well known to those skilled both in the art of programming and in the art of the design of electronic circuits, any C program functionality can always be implemented in equivalent electronic hardware, and vice versa, subject only to time and cost constraints. Similarly, the functionality of a C program can be implemented in other programming languages, or implemented anew in C as a different but equivalent C program, without substantively deviating from the functionality of the original C program.

The C data type "float" has been used throughout this example. The "float" data type typically requires less storage space than the more common "double" data type. In using float, I am illustrating that data type "double" is not required for successful implementation of a corob cell. In fact, a comparable corob cell could be built in C and operated successfully using the data types of "int" or even "char" in place of "float." A corob cell could even be built and operated successfully if the data type of the "float" variables were changed to one-bit binary variables. Once an understanding of the concepts of corob computing systems is obtained, those skilled in the art of programming will be able to implement these alternative situations with reference to this current example C code and by utilizing well-known techniques and methods that identify and deal with the programming issues of changing variable types in a program.

In FIG. 5, the structure and functional prototypes of the corob cell of FIG. 4 are elucidated in the form of a C header file. Line numbers have been added to the standard C code to aid in discussion.

The constant, TOLERANCE, of line 1 of FIG. 5 controls an aspect of the execution of a cell, and will be discussed in the section below that covers the execution of a cell.

The constant, MAX_PAIRS, of line 2 of FIG. 5 will be discussed shortly.

Lines 4 through 7 of FIG. 5 define (typedef) the structure of a STATE, which is a single element of a corob. In this example of the preferred form, a STATE consists of two variables, val and sig, both of type "float." A STATE can take many other forms as well. Very effective corob systems can be built that do not have the value, sig. In such systems, all corobs would be defined in ordinary sub-spaces that have the same number of dimensions as the space in which the sub-spaces are defined. It is also useful in many instances to force the value, sig, to be either a 1.0 or a 0.0, for example by comparing a computed value of sig to a threshold and choosing 1.0 if the value is above the threshold and 0.0 if it is below. Corobs constructed from STATES in this way would be defined in ordinary sub-spaces that are of a dimensionality that is (usually) less than that of the space in which the sub-spaces are defined. Other options for defining STATE are possible, so long as the corobs that result from choosing one of these options conforms to the definition of a corob as "a point in a generalized sub-space of a particular space."

Lines 9 through 13 of FIG. 5 define (typedef) the structure of a COROB, for the purposes of this current example. Line 10 specifies storage for the number of dimensions, the variable, nbr_of_dims, in the space that hosts the corob and its sub-space. Lines 11 and 12 are essentially the same as a STATE, although I have chosen to implement the elements of the COROB as arrays here, instead of using the STATE data type directly.

Lines 15 through 24 of FIG. 5 define (typedef) the structure of a CELL, and exemplify a corob cell data area. Said CELL was shown in schematic form in the corob cell of FIG. 4. First, storage for the number of dimensions of the host space for corob sub-spaces is defined as the variable, nbr_of_dims. The equivalent of the input register 40 of the corob cell of FIG. 4 is defined as the variable, input_corob, of data type "COROB," in line 17 of FIG. 5. The equivalent of the output register 46 of the corob cell of FIG. 4 is defined as the variable, current_state, of data type "STATE," in line 18 of FIG. 5. The equivalent of the corob memory 44 of the corob cell of FIG. 4 is defined as the variable, corob_memory, in lines 19 through 23 of FIG. 5, and corob_memory, which exemplifies a corob memory data area, is a structure data type consisting of the variable, nbr_of_entries, of data type "int," in line 20, the variable, corob, of data type "COROB array," in line 21, and the variable, state, of data type "STATE array," in line 22. The variable, nbr_of_entries, in line 20 provides storage for the current number of entries in the corob_memory system of this cell, all line numbers of FIG. 5. For coding convenience, the maximum number of entries is defined as the constant, MAX_PAIRS, in line 2 of FIG. 5, and MAX_PAIRS is used in lines 21 and 22 to designate how much storage space to provide in the respective array variables found there. MAX_PAIRS is arbitrarily set to 100 here, although very much larger values can be used effectively in a corob cell, subject to the constraints of the host computer system or electronic hardware implementation.

The functional prototypes shown in lines 26 through 33 of FIG. 5 are useful in C programs to aid debugging. Each of these functions will be discussed in detail shortly.

Next, I consider the fundamental functionalities required of the corob cell of FIG. 4. Referring to FIG. 4, these functionalities include the ability to create and initialize states, corobs, and cells, the ability to load the input register 40 and the output register 46, the ability to store the input corob, held in the input register 40, together with the output state, held in the output register 46, into the corob memory 44, the ability to execute the corob cell to compute a new value for the output register 46 from the corob in the input register 40 and the current contents of the corob memory 44 according to the teaching of the present invention, and finally, to compute a metric of the distance from one corob to another corob, typically from the corob found in the input register 40 to one of the corobs found in the corob memory 44. Each of these functionalities are exemplified as a particular C program module.

FIG. 6 exemplifies, in a C function, the procedure for creating and initializing a state, according to the preferred form of the present invention. In FIG. 6, a state is created in lines 2 and 3. In lines 4 and 5, the created state is set to a random value between 0.0 and 1.0, inclusive. This default initialization may, of course, be overwritten by subsequent code at need, but randomized values in the variables, val and sig, are required often enough to make this default behavior useful. The completed storage is returned to the caller in line 6.

FIG. 7 exemplifies, in a C function, the procedure for creating and initializing a corob, according to the preferred form of the present invention. In FIG. 7, a corob is created in lines 3 through 6. In addition to creating the corob structure in line 3, lines 4 through 6 create the storage for the val and sig arrays of the storage for the corob structure with lengths, or numbers of elements, equal to the variable, nbr_of_dims, passed in as a parameter from the caller in line 1. This variable, nbr_of_dims, constitutes the number of dimensions of the host space of the corob as described in the present invention. Lines 7 through 10 establish a random corob in the corob storage space just created, each of whose elements is a number between 0.0 and 1.0, inclusive. This default initialization may, of course, be overwritten by subsequent code at need, but a random corob is required often enough to make this default behavior useful. The completed storage is returned to the caller in line 11.

FIG. 8 exemplifies, in a C function, the procedure for creating and initializing a cell, according to the preferred form of the present invention. In FIG. 8, a cell is created in lines 4 through 7. In addition to creating the cell structure in line 4, lines 5 through 7 create the storage for the val and sig arrays of the input register 40 of FIG. 4. Lines 8 through 13 of FIG. 8 complete the creation of the corob memory 44 of FIG. 4, by creating the storage for the elements of the individual corobs of the corob array, shown in line 22 of FIG. 5. The creation of the storage for the cell in lines 4 through 7 of FIG. 8 creates both of the fixed arrays, the corob array and the state array, lines 21 and 22 of FIG. 5, respectively. The state array requires no further allocation since its elements are the individual fixed variables of the STATE structure, val and sig. The completed storage is returned to the caller in line 14.

FIG. 9 exemplifies, in a C function, the procedure for loading the input register 40 of a cell of FIG. 4 with a corob, according to the preferred form of the present invention. In FIG. 9, a pointer to the cell and storage containing the corob are passed in by the caller in line 1. Lines 4 through 7 copy the corob data, the contents of the variable, corob, into the appropriate place in the cell, the portion of the cell structure designated by the variable name, input_corob. In line 8, the number of dimensions of the copied corob, corob.nbr_of_dims, is copied to the cell's data structure. This completes the loading of the input register 40 of FIG. 4 of the cell with a corob. The functionality exemplified in FIG. 9 is useful in later operation of the cell, to be described shortly.

FIG. 10 exemplifies, in a C function, the procedure for loading the output register 46 of a cell of FIG. 4 with a state, according to the preferred form of the present invention. In FIG. 10, a pointer to the cell and storage containing the state are passed in by the caller in line 1. Lines 3 and 4 copy the state data, the contents of the variable, state, into the appropriate place in the cell, the portion of the cell structure designated by the variable name, current_state. This completes the loading of the output register 46 of FIG. 4 of the cell with a state. The functionality exemplified in FIG. 10 is useful in later operation of the cell, to be described shortly.

FIG. 11 exemplifies, in a C function, the procedure for loading a new entry into the corob_memory 44 of a cell of FIG. 4. An entry consists of a corob, the contents of the cell's input register 40 of FIG. 4, together with a state, the contents of the cell's output register 46 of FIG. 4. A pointer to the cell on which to operate is passed into the function of FIG. 11, learn(), in line 1. Lines 4 through 12 perform the actual moving of the entry into the corob memory 44 of FIG. 4. The corob portion of the entry is moved into correct position in lines 5 through 8 of FIG. 11, while the state portion of the entry is moved into correct position in lines 9 and 10. For convenience, a temporary variable, idx, is set in line 4 to the value of the current number of entries in the cell's corob memory 44 of FIG. 4. That value is increment by one in line 11 to reflect the fact that an entry has been added to the corob memory 44. This completes the loading of a new entry into the corob memory 44, a functionality that is necessary to allow the installation of programmatic information into a cell so that it may operate.

FIG. 12 exemplifies, in a C function, the preferred procedure for executing the corob cell to compute a new value for the output register 46 of FIG. 4 from the corob in the input register 40 of FIG. 4 and the current contents of the corob memory 44 of FIG. 4 according to the teaching of the present invention. The comments that appear in the C code of FIG. 12 provide a high level description of its functionality. A pointer to the cell on which to operate is passed into the function of FIG. 12, execute(), in line 1. The code in lines 5 through nine define and load a metric vector, *mt, each element of which consisting of the distance produced by the application of the metric function, metric(), from the corob in the input register 40 of FIG. 4, to a particular one of the corobs in the cell's corob memory 44 of FIG. 4. The code in lines 11 through 21 of FIG. 12 define and load a weight vector, *wt, that indicates the relevance, according to the metric vector, *mt, of each of the corobs in the corob memory 44 of FIG. 4 to the corob in the input register 40 of FIG. 4. Line 12 of FIG. 12 creates storage for the weight vector, *wt. Lines 13 through 18 of FIG. 12 compute each weight vector, *wt, element as the inverse square of the corresponding metric vector, *mt, element. In the event that this metric distance is actually 0.0, which situation corresponds to an exact match from the input corob in the input register 40 of FIG. 4 to the corob currently being considered of the corob memory 44 of FIG. 4, then a "divide by zero" would occur in line 16 of FIG. 12, if not for the code in line 15 of FIG. 12. The constant, TOLERANCE, defined in line 1 of FIG. 5, provides a minimum value that an element of the metric vector, *mt, can take on. The constant, TOLERANCE, is set to a suitably small value that is essentially zero by comparison with metrics that are likely to be computed for corobs in the corob memory 44 of FIG. 4 that are considered not to be nearby the corob in the input register 40 of FIG. 4. In this way, an exact match, or very nearly an exact match, will not result in a "divide by zero" error. For purposes of normalization, discussed shortly, a sum, totwt, of the weight vector, *wt, is produced by lines 13 and 17 of FIG. 12. Lines 19 through 21 perform the normalization of the weight vector, *wt, so that after normalization, the sum of the elements of the weight vector will be 1.0.

Lines 23 through 27 of FIG. 12 exemplify the functionality needed to create the val portion of the state to be written into the output register 46 of FIG. 4. It is simply the sum of the val elements of the states stored in the corob memory 44 of FIG. 4 corresponding to the corobs stored the corob memory 44 of FIG. 4, each val weighted by the normalized weight vector, *wt. Thus the nearer is the corob in the corob memory 44 of FIG. 4 to the corob in the input register 40 of FIG. 4, the more heavily the corresponding val element will influence the final value of the val portion of the state written into the output register 46 of FIG. 4.

Into the significance portion, sig, of the state written into the output register 46 of FIG. 4 must be written a number that represents the significance of the val portion computed in lines 23 through 27 of FIG. 12. Many tests of significance are known, and most could be used effectively to accomplish this purpose. What is required is that the sig value that results must reflect how close a match to the input corob in the input register 40 of FIG. 4 is found in the corob memory 44 of FIG. 4. The sig value, moreover, must be a number between 0.0 and 1.0 in the preferred implementation, with a value of 0.0 representing the fact that no corob in the corob memory was closer than approximately standard distance to the corob in the input register, a value of 1.0 representing the fact that an exact match was found in the corob memory, and with intermediate values, between 0.0 and 1.0, representing intermediate situations. The code in lines 29 through 34 of FIG. 12 accomplishes these goals by the simple means of finding the largest element of the normalized weight vector, *wt, and setting the sig of the output state written into the output register 46 of FIG. 4 to that value. This is a rather arbitrary choice of means, and those skilled in the art of statistics will recognize that there are indeed many alternative choices that could be made while keeping within the teachings of the present invention.

A final functionality is implemented in lines 36 through 38 of FIG. 12. The val portion of the state value just computed above is mixed with a random number between 0.0 and 1.0, inclusive, in light of the sig portion of the state value just computed above. The mixing is done such that if the sig portion of the state value is 1.0, the val portion of the state value is unchanged; if the sig portion of the state value is 0.0, the val portion of the state value is ignored and completely replaced with a random number between 0.0 and 1.0; and, intermediate values of the sig portion of the state value produce intermediate mixings of the val portion of the state value just computed and a random number between 0.0 and 1.0. This mixing is not strictly necessary. It is present in the preferred form of the present invention because it introduces a approximate nature to the computed state value that is useful when state values from multiple corob cells are combined to form corobs in a corob computing system that incorporates many corob cells. The approximate nature of the state value introduced in this present corob cell preferred form provides an approximate nature to these resulting corobs that reflects the significance of the corobs as a whole, when they are used as data tokens. As in other areas of the present invention, the exact form of the mixing here described does not matter a lot, providing that the general functional characteristic is retained that higher significances, that is, larger computed values of the sig portion of the state, result in the val portion of the computed state being more reflective of the actual computed value of the val portion, and vice versa.

The functionality described above and illustrated in FIG. 12 is in fact a specific interpolation technique for which there are a great many alternative computational methods that will produce essentially the same results. I called this method of weighting by the inverse squares of the metric distances of example points the "scalar gravity" method, because of its analogy to the fall-off of gravitational force with the square of distance and the absence here of directional or vector information about that force. Scalar gravity produces interpolation results very similar to those that can be obtained from a wide range of so-called "neural network" methods of interpolation. Scalar gravity features extreme simplicity and speed, in addition to providing the type of interpolation capabilities required by the present invention, all of which recommends it over most other interpolation methods. However, an understanding of the present invention and the role played by scalar gravity in the present invention will convince the reader that it is the functionality of this type of interpolation that is important, and the substitution of alternative interpolation methods, including any of the neural network methods, for scalar gravity in the present invention, will not create a construct substantially different from the present invention.

In passing I note that other values for the exponent of the scalar gravity method, values besides a minus two that corresponds to inverse square, can be utilized to great effect in particular circumstances. Negative values whose magnitudes are increasingly greater that two, up to infinity, will result in the partitioning of the interpolation space into increasingly well-defined regions with increasingly sharp boundaries, thus emphasizing more and more the nearest interpolation data point previously seen, until only the nearest interpolation point is used in arriving at an interpolated value. Negative values whose magnitudes are increasingly less than two, down to the value of zero, will result in the effective homogenizing of the interpolation space, thus incorporating increasingly the nearer interpolation data points until, at a value of zero, the interpolation result will be simply the grand average of all available interpolation data points. This exponent can be adjusted to mimic the near-field and far-field behavior of essentially any neural network interpolation method.

Lines 41 and 42 of FIG. 12 simply release storage that is only needed by this current function, execute(). This completes the description of the functionality exemplified in FIG. 12.

FIG. 13 exemplifies, in a C function, the procedure for computing the metric of the preferred form of the invention from one corob to another. The corob data to be considered is provided in line 1 of FIG. 13 in the form of two variables both of data type COROB. These variables are designated with the names "to" and "from" to help keep straight in what direction the metric is being computed, from the "from" corob to the "to" corob. The actual computation is accomplished in lines 3 through 7. Line 3 implements a loop control functionality that allows consideration of each corresponding corob states in turn of the two corobs. For each state, a difference is formed in line 4 between the val portion of the corresponding states of the two corobs, as the value of the variable, xi. In line 5, the value, xi, is squared, weighted by the sig portion of the "from" corob corresponding state only, and the result is accumulated in the variable, sum. In line 7, the square root of the variable, sum, is returned to the caller.

The reason that only the sig portion of the "from" corob is involved in this metric has been discussed earlier. It is a means to provide exactly the ordinary Cartesian distance, the square root of the sum of the squares, between two points, otherwise known as corobs, in a space, in the event that each of the sigs of the sig portion of the "from" corob is exactly 1.0, in which case the sub-space of the "from" corob is exactly the same as the space in which that sub-space is defined. When some or all of these sigs deviate from 1.0, then a generalized sub-space results. In a generalized sub-space, the two corobs upon which the metric is operating may not be, in fact probably are not, defined in identically the same generalized sub-spaces of the space. In such an instance, many distance metrics become non-reflexive, that is, may not produce the same metric when measuring from one of the corobs to the other as is produced when measuring in the opposite direction. The metric chosen here as the preferred form for the present invention is one that produces familiar Cartesian distance results in familiar, non-generalized sub-space, circumstances, and produces usable results when generalized sub-spaces are present. Many other choices are possible, subject to the conditions on the metric previously discussed.

A concrete example of the use of the functionalities of the corob cell architecture described above is presented in FIG. 14. This example creates a corob cell of FIG. 4, fully loads it with data, then extracts one of the associations, the corob/state pairs, from the cell's corob memory 44 of FIG. 4 and uses the corob portion of the pair to load the input register 40 of FIG. 4. The cell is then executed to produce a new state value in the output register 46 of FIG. 4, which can then be compared with the state portion of the pair extracted from the corob memory 44 of FIG. 4.

In FIG. 14, lines 1 through 4 bring in standard C header files needed by the rest of the program. Line 5 brings in the definitions, the file "cell.h," of the cell of FIG. 4 shown in FIG. 5. Line 6 establishes the size of the corobs that will be used in this example, specifically, corobs whose host space has 100 dimensions. Line 7 is the entry point, the point where execution begins, for the C program of FIG. 14. Line 7 provides standard parameter list means for obtaining data from the command line. Line 8 defines various storage and variable names that are needed by this program. Line 9 obtains a data item from the command line and stores it into the variable fract. This allows the program to be run from the command line with different data, without the need to recompile. Line 10 creates the data structure for a cell and stores it into the variable, cell. Lines 11 through 19 load the corob memory 44 of FIG. 4 of the cell of FIG. 4 with random corobs, each associated with a random state. Line 11 is a loop control that proceeds systematically through all of the available storage locations in the corob memory 44 of FIG. 4, a total number given by the constant MAX_PAIRS that is defined in line 2 of FIG. 5. Line 12 of FIG. 14 creates a new random corob, and line 13 loads that corob into the input register 40 of FIG. 4. Line 14 of FIG. 14 creates a new random state, and line 15 loads that state into the output register 46 of FIG. 4. This completes the initialization requirements for storing data into the corob memory of the cell, so in line 16, the function, learn(), is called to accomplish the transfer of the corob/state pair into the corob memory of the cell. Line 17 releases the storage for the corob and the state that were created earlier in the loop, to avoid a memory leak.

Continuing in FIG. 14, lines 20 through 30 set up a test of the cell and its data that has been defined thus far. Line 20 creates a new random corob. In this case, the data in the corob is irrelevant to the purposes of this code, and it is the storage allocation only that is important in line 20. Lines 21 through 30 systematically replace the data within the corob created in line 20 with a selected one of the corobs from the corob memory, possibly corrupted with some noise, so that the corob so retrieved can be presented to the cell to see if the cell can generate the state value that was associated with that corob during the loop of lines 11 through 19. Line 22 loads the variable, fuzz, with a random number that is in the range of (−0.5*fract) to (+0.5*fract), where fract is supplied by the user of this program from the command line, in line 9. In line 23, corob[0], which is the first corob of the corob memory of this cell, is retrieved from the corob memory and the variable, fuzz, is added to the val portion of each element of the corob, the result of which computation is then stored into the corresponding val portion of the variable, corob. Line 23 provides means for the user of this program to introduce controlled amounts of random noise into the variable, corob, that will hold the corob selected from the corob memory. In lines 24 and 25, adjustments are made to the number thus computed, so that the resulting val portion of the variable, corob, will not exceed the range, 0.0 to 1.0, inclusive. In lines 27 through 29, a similar procedure is applied to the sig portion of the selected corob. When the loop of lines 21 through 30 exits, the variable, corob, will contain an exact copy of the selected corob from the corob memory if the variable, fract, has the value 0.0, and will contain an approximate copy of the selected corob if the variable, fract, has a value that is different from 0.0. The greater is the magnitude of the variable, fract, the greater will be the deviation of the resulting corob in the variable, corob, from the corob selected from the corob memory. This mechanism provides means for the user of this program to test the effects of such approximations.

Continuing in FIG. 14, line 31 loads the input register 40 of FIG. 4 of the cell of FIG. 4 with the data in the variable, corob, just created. Line 32 of FIG. 14 reports to the user the value of the variable, fract, supplied by the user. Line 33 reports to the user the val portion of the state that is associated in the corob memory with the selected corob, which val portion is to be regarded as the "right" answer that should be generated by the execution of the cell. With the corob memory having been initialized and the input register having been loaded, the cell can now be executed, and this is done in line 34. Lines 35 and 36 report to the user the contents of the output register 46 of FIG. 4 after the cell has been executed. These contents can then be compared to the so-called "right" answer to see how well the cell performed its various functions.

I will now show the results presented to the user from two executions of the program of FIG. 14. Here is the first result:

noise factor: fract=0.000000 original val=0.293723 cell generates val=0.293723 with sig=1.000000

The first result above shows that the value for the variable, fract, supplied by the user on the command line is 0.0, and that the "right" value, the one stored in the corob memory, for the val portion of the state, is 0.293723. The output states that the cell generated a val of 0.293723, with a sig or significance value of 1.000000. Thus if no noise is introduced to the corob, the cell generates precisely the "right" answer with one hundred percent confidence.

Here is the second result:

noise factor: fract=0.010000 original val=0.293723 cell generates val=0.295516 with sig=0.995363

In the second result above, one percent noise factor, a value of the variable, fract, of 0.01, is introduced. In this case, the output states that the cell generated a val of 0.295516, with a sig value of 0.995363. Thus a small amount of noise produces a slight variation in the generated variable, val, with a slightly reduced confidence, as expected.

Note that a generalization of the corob cell is readily available. The output register 46 of FIG. 4 of the cell could be made to hold a corob, a set of states, instead of exactly one state. The corob memory 44 of FIG. 4 would then be expanded to accommodate the cell's learning associations of input corobs with output corobs instead of just output states. Execution of the cell would simply apply the weight function to a given corresponding element of all of the output corobs, to form the corresponding element of the new output corob. This is in fact equivalent to a construct of as many cells as there are elements in this output corob, where the cells each have only one corob element or state as the size of the output register. The corob-corob cell is inherently more efficient than the corob-state cell, if it can be used in a given application. To retain the generality of corob systems, however I will not use this corob-corob cell, because as will be seen shortly, corob systems may require the corob-state model. Using corob-corob cells in such a situation would be inefficient, since much of the output corob would have to be ignored and wasted.

Corob Computing Systems Architecture

Next, I take up the implementation of corob computing systems, which are systems of corob cells. Corob computing systems are fully functional, unqualified, Turing complete computing systems that can execute any computable function and whose computational strengths lie in areas similar to the areas of computational strengths of living information processing systems.

FIG. 15 is a schematic drawing illustrating the major components of a corob computing system of the present invention. An array of corob cells 50 is comprised of a definite number of corob cells. For convenience in discussion, I will designate the leftmost corob cell of the array of corob cells 50 to be corob cell 1 of the array, the corob cell to its immediate right in the array of corob cells 50 will be designated corob cell 2, and so forth, up to the rightmost corob cell of the array of corob cells 50, which rightmost cell shall be designated corob cell N, where "N" represents the definite number of corob cells that comprise the array of corob cells 50.

In FIG. 15, the cells of the array of corob cells 50 are all designated "internal" corob cells, indicating that they are members of the cells that comprise this corob computing system, also indicating equivalently that they are members of the array of corob cells 50.

In FIG. 15, some or all of the cells of the array of corob cells 50 may also carry either or both of the additional designations, "sensor" and "actor." A sensor cell of the array of cells 50 may have a state value imposed on it in whole or in part; that is, the value in the output register 46 of FIG. 4 of a sensor cell of the array of cells 50 in FIG. 15 may have its data contents set or influenced by means that are external to the corob computing system. An actor cell of the array of cells 50 may have its state value copied in whole or in part to a location that is outside of the corob computing system per se; that is, the value in the output register 46 of FIG. 4 of an actor cell of the array of cells 50 in FIG. 15 may have its data contents read or partially read by means that are external to the corob computing system. Sensor cells provide means by which external means can provide data to a corob computing system, while actor cells provide means by which external means can read data from a corob computing system.

In FIG. 15, the group of cells marked with the identifying number "54" comprise the designated set of sensor cells 54 of the array of corob cells 50, and the group of cells marked with the identifying number "56" comprise the designated set of actor cells 56 of the array of corob cells 50. As has been stated, any corob cell of the array of corob cells 50 may function as a sensor cell, an actor cell, both a sensor cell and an actor cell, or neither a sensor cell nor an actor cell, depending on the exact specifications for a particular corob computing system within the context of the present invention, that may be laid down by a designer.

In FIG. 15, a map 52 defines the relationships among the corob cells of the array of corob cells 50. The map 52 is a two-dimensional register array of data storage elements that may store either of the values "true" or "false" in appropriate representations, or may store more complex values. The two-dimensional array of elements, and therefore the map 52, consists of N columns of N data storage elements, where "N" is that definite number of corob cells in the array of corob cells 50. Each column of the map 52 corresponds to exactly one corob cell of the array of corob cells 50. Each data storage element of a given column of the map 52 also corresponds to exactly one corob cell of the array of corob cells 50. Values in the data storage elements of the map 52 determine which corob cells of the array of corob cells 50 take input from which corob cells of the array of corob cells 50.

For example, select a particular element of map 52. Suppose that the selected element lies in column "c" and row "r" of map 52, where "c" and "r" are both numbers between 1 and N, the definite number of corob cells in the array of corob cells 50. Then a "true" value in the selected element indicates that the corob cell of the array of corob cells 50 that carries the number "c" will take input from the corob cell of the array of corob cells 50 that carries the number "r," while a "false: value in the same selected element indicates that input will not be taken. If each data storage element of the map 52 is capable of taking on more values than just "true" and "false," for example if these data storage elements can store a number of data type "integer" or a number of data type "float," then a more elaborate dependency may be specified between corob cells of the array of corob cells 50, such as a mathematical proportion. However, in the preferred form of the present invention, each element shall take on only the values of "true" or "false," suitably represented in the particular implementation.

To be precise, when I say that a corob cell, c, of the array of corob cells 50 "takes input" from another such corob cell, r, what I mean is that one of the data storage elements of the input register 40 of FIG. 4 of the corob cell, c, is reserved exclusively for holding states retrieved from time to time from the contents of the output register 46 of FIG. 4 of the corob cell, r. Exactly when and under what circumstances this retrieval takes place will be described shortly.

Note in particular that the map 52 provides means that allows each corob cell of the array of corob cells 50 to take input from any or all of the corob cells of the array of corob cells 50, including itself. The map 52 constitutes what is commonly referred to by those skilled in the art as a cross-bar switch. Cross-bar switch means, as defined, is therefore a component of a corob computing system.

A corob computing system is a general purpose computer. As such, it must be programmed for each particular task it is to perform. One part of this necessary programming for a particular task is the specification of the contents of each data storage element of the map 52. Exactly how to do such specification, indeed, how to program a corob computing system in general, is beyond our scope here, much as the art of programming a traditional computer system is beyond the scope of a description of the nature of a traditional programmable computer. The important point here is the fact that the present invention provides means to do such programming.

It was previously stated that all corob based computing systems may support three distinct phases of programming and use, the architecture phase, the education phase, and the operation phase. These three phases may now be more fully understood with reference to FIG. 15.

The architecture phase of the programming and use of a corob based computing system consists of specifying: the number of corob cells that will comprise the array of corob cells 50; the contents of the map 52 that defines the inter-relationships among the corob cells of the array of corob cells 50; the particular corob cells of the array of corob cells 50 that are to be designated as "sensor" cells; and, the particular corob cells of the array of corob cells 50 that are to be designated as "actor" cells. It is also typically necessary when developing a particular application program for the corob based computing system, but not a part of the programming and use of the corob based computing system itself, to specify the nature of any sensor or actor functionality external to the sensor cells and the actor cells, required to prepare data for insertion into sensor cells or to process data received from actor cells, and nature of the interactions that may take place between these external functionalities and the sensor cells and actor cells of the corob based computing system. In plain language, the programmer must decide how and for what purposes the sensor cells of the corob based computing system will be set to state values, and likewise how and for what purposes the state values of the actor cells will be retrieved. In living systems, external sensor functionalities often include such things as eyes and ears, while external actor functionalities express themselves through muscle motion.

The education phase of the programming and use of a corob based computing system may have a static or a dynamic component, or both. The static education of a corob based computing system consists of installing appropriate data, corob and state pairings, into the various corob memories 44 of FIG. 4. Exactly how to develop this appropriate data is a deep subject far beyond our present scope. However, a simple example will be presented shortly. The dynamic education of a corob based computing system consists of allowing the corob based computing system to decide for itself, in an automatic fashion, what data, corob and state pairings, is appropriate to store into the various corob memories 44 of FIG. 4. Research is ongoing into methods to accomplish this purpose, and the topic again leads far beyond our current scope. However, one simple dynamic education method can be described.

Whenever a given corob cell fails to find a "good" match in its corob memory 44 of FIG. 4 to the corob currently present in the input register 40 of FIG. 4 of the corob cell, usually referred to as the "current corob," the corob cell can respond by storing the current corob, paired with the current state, into the corob memory. This is an effective learning strategy for many situations, and in fact has precedence in living neural systems.

The operation phase of the programming and use of a corob based computing system consists of an ongoing iteration, each step of which is comprised of the following sequence: accept any input that may be available to the sensor cells 54 of FIG. 15; load the input registers 40 of FIG. 4 of all of the corob cells of the array of corob cells 50 of FIG. 15 by accessing the contents of the output registers 46 of the corob cells designated for each corob cell in the map 52 of FIG. 15; execute each corob cell in turn, according to its functionality, to produce a new state value in its output register 46 of FIG. 4 from its input register 40 of FIG. 4 and its corob memory 44 of FIG. 4; and, finally, for each actor cells, make available to external functionality the data in that cell's output register 46 of FIG. 4. Once initiated, this process continues indefinitely, much as the machine cycle of a traditional computer continues indefinitely, regardless of what program that machine may be running.

I will now present a detailed example of the structure and operation of the corob computing system of FIG. 15. This example embodies the preferred form for the corob computing system. However, as previously noted, this patent teaches that the design and construction of corob computing systems involve many variables and decisions, and that there are wide latitudes available in setting these variables and making these decisions so that the precise choice, even in the preferred form, may not hold much advantage over other choices, and can even be somewhat inferior to other choices in a given set of circumstances. As was done with previous examples, this example is presented in the C programming language for convenience in expressing the concepts. As is well known to those skilled both in the art of programming and in the art of the design of electronic circuits, any C program can always be implemented in equivalent electronic hardware, and vice versa, subject only to time and cost constraints. Similarly, a C program can be implemented in other programming languages, or implemented anew in C as a different but equivalent C program, without substantively deviating from the functionality of the original C program.

The example of the preferred form of a corob computing system of FIG. 15 begins with FIG. 16. The structure and functional prototypes of the corob computing system of FIG. 15 are elucidated in the form of a C header file. Line numbers have been added to the standard C code to aid in discussion.

I have noted previously that the map 52 of FIG. 15 is a two-dimensional array, each column of which specifies what corob cells of the array of corob cells 50 of FIG. 15 provide input to the corob cell of the array of corob cells 50 of FIG. 15 that corresponds to the particular column. In lines 1 through 4 of FIG. 16, a column of the map 52 of FIG. 15 is represented as a data structure typedef that establishes the data type name, MAP. The data type MAP will be used to build up columns of the map 52 of FIG. 15, and for other purposes, to be seen shortly. Line 2 of FIG. 16 defines the number of cells, the length of the column. Recall that the data storage elements of the column are defined for all corob cells in the array of corob cells 50 of FIG. 15, the variable, nbr_of_cells, in line 2 will be set to the same value as the variable, nbr_of_cells, in line 7 that defines the total number of corob cells in the array of corob cells 50 of FIG. 15. The a pointer to the storage for the column is defined in line 3, and actual storage space will be allocated later in the make_map() function, to be discussed shortly. In large corob computing systems, this total number of corob cells may be quite large, while the number of cells from which any given cell takes input may be much smaller, resulting in most of the data elements of the column being marked "false," with the few that remain being marked "true." This is a very wasteful approach that can be relieved by a somewhat more involved storage scheme that stores only the indexes of the cells marked "true" instead of an indicator for every cell, but the approach taken here is perhaps more clear to the reader. A production corob system would likely take a more efficient approach, such as the one just described.

Lines 6 through 13 of FIG. 16 define (typedef) the structure of a corob system corresponding to that shown as the subject of FIG. 15, and exemplify a corob computing system data area. As stated above, Line 7 defines the total number of corob cells in the array of corob cells 50 of FIG. 15. Line 11 of FIG. 16 provides a pointer to the array of corob cells 50 of FIG. 15 that will be allocated shortly in the function, make_corob system(). Line 10 similarly provides a pointer to the storage that will hold the map 52 of FIG. 15. Lines 7 and 8 utilize the MAP data type to define storage to hold data specifying which cells are designated sensor cells, and which are designated actor cells, respectively. The variable, prev_stat, of line 12 is used to hold the previous states of all the cells of the array of corob cells 50 during a current iteration of the corob system, to prevent the execution of a particular cell from utilizing newly computed values of cells instead of values resulting from the previous iteration, which can happen when a cell takes input from cells that have already been executed during an iteration. This storage could easily be eliminated, and should be, in the current preferred form of the present invention by simply storing all cell states into the input registers of the cells that need them, as previously described, but again the form shown was considered to be less confusing to the reader.

The functional prototypes shown in lines 15 through 18 of FIG. 16 are useful in C programs to aid debugging. Each of these prototyped functionalities will now be exemplified in detail as a particular C program module.

FIG. 17 exemplifies, in a C function, make_map(), the procedure for creating and initializing the storage, called here by the variable name, map, used to hold a column of the map 50 of FIG. 15, and for holding similar map data, according to the preferred form of the present invention. In FIG. 17, a variable, map, is created in line 3. Line 4 defines the length of the storage to be allocated, while line 5 performs the actual allocation of storage. Lines 6 and 7 perform a loop over the elements of the map array, setting each to a value provided by the array, map_data, brought in through the function's parameter list in line 1. Line 7 returns the storage to the caller for further use.

FIG. 18 exemplifies, in a C function, make_corob system (), the procedure for creating and initializing the storage, called here by the variable name, cs, used to hold a corob computing system, the subject of FIG. 15. The lines 1 through 3 of FIG. 18 show several important parameters. In line 2, the variable, nbr_of_cells, determines how many cells will comprise the array of corob cells 50 of FIG. 15. Also in line 2 of FIG. 18, the array variable, nbr_of_dims[], provides to the routine of FIG. 18 the size of the corob space for each cell. Line 3 of FIG. 18 provides the variables, sensor, actor, and internal, that will be used to hold elements of the completed corob system data structure. Line 5 creates storage for the corob system itself. Line 6 sets the number of cells in the corob system. Line 7 creates storage for the variable, sensor, which will hold the designations of which cells are sensor cells 54 of FIG. 15, and initializes it using the data provided on line 3 of FIG. 18. Line 8 creates storage for the variable, actor, which will hold the designations of which cells are actor cells 56 of FIG. 15, and initializes it using the data provided on line 3 of FIG. 18. Line 9 of FIG. 18 creates storage for the variable, internal, which will hold the map 52 of FIG. 15. In line 10, a pointer that will point to the array storage for the cells of the array of corob cells 50 of FIG. 15 is defined. Lines 11 through 14 create storage and initializes cells of the array of corob cells 50 of FIG. 15 and of the map 52 of FIG. 15. Line 12 of FIG. 18 creates storage, then moves the column data for cell "i" into its proper place in the corob system data structure. Line 13 creates storage and initializes the particular cell, as was previously described in the section on the function, make_cell(). Finally, line 16 returns the completed corob computing system structure of FIG. 15 to the caller for further use.

FIG. 19 exemplifies, in a C function, execute_cells(), the procedure for executing one internal iteration of the cells of the corob computing system of FIG. 15. A pointer to the corob computing system to be iterated is passed into the function in line 1 of FIG. 19. Lines 3 through 6 move the contents of output register 46 of FIG. 4 of each of the cells in the array of corob cells 50 of FIG. 15 to a holding area, as previously described, to insure that each cell uses the right information during its execution. It would be more efficient to move the data directly into the input register 40 of FIG. 4 of each cell in the array of corob cells 50 of FIG. 15, but the method shown here was deemed to be a clearer presentation of functionality for the reader. The loop shown in lines 7 through 20 of FIG. 19 actually sets up the input register 40 of FIG. 4 for each cell, then executes the cell. Lines 9 through 17 of FIG. 19 accomplish the former, while line 19 accomplishes the latter. When the loop of lines 7 through 21 completes, one internal iteration of the corob computing system has been accomplished. All that remains is to run any external actor functionality to provide output from the corob computing system for this cycle of iteration, then run any external sensor functionality to similarly provide input. How to do this will be shown shortly.

A full programming example of the use of the functionalities of the corob computing system described above is presented in FIGS. 20 through 22. This example shows each of the phases of corob computing, architecture, education, and operation. In overview, the example stores one hundred corob/corob pairs (to be defined shortly) in an array of ten cells, then recovers them. A full programming example of the use of the functionalities of the corob computing system described above is presented in FIGS. 20 through 22. This example shows each of the phases of corob computing, architecture, education, and operation. In overview, the example stores one hundred associations of corob/corob pairs (to be defined shortly) in an array of ten cells, then recovers them. The corobs are defined so that output corob of the first pair of corobs stored becomes the input corob for the second pair of corobs, the output corob of the second pair of corobs stored becomes the input corob for the third corob pair, and so forth for all of the pairs stored. During operation, the input corob of the first pair is presented to the system through the sensor input and an output corob is retrieved through the actor output. The retrieved corob then becomes the input corob and a new output corob is retrieved, and so forth through as many iterations as there are stored corobs. If the system works as advertised, this "chained" approach should result in the final corob being the same as the originally stored output corob of the final pair stored. A metric is used in the example to determine that this is in fact the case.

In the description of the functionality of the corob cell, I showed an example that associated an input corob with a state. Corobs are comprised of elements called states, so it is natural to aggregate the output states of a number of corob cells into a single corob. This is in fact a fundamental concept in corob computing systems, and it will be illustrated in this example.

In FIG. 20, lines 1 through 4 bring in standard C header files needed by the rest of the program. Line 5 brings in the definitions, the file "cell.h," of the cell of FIG. 4. Line 6 brings in the definitions, the file "corob_system.h," of the corob computing system of FIG. 15. Line 8 of FIG. 20 is the definition of a constant that will be used to establish the total number of cells of the array of corob cells 50 of FIG. 15 in this example. Line 9 of FIG. 20 is the definition of a constant that will be used to limit the number of iterations of this example. Lines 11 and 12 provide prototype information used by C compilers to aid in debugging. Line 14 creates a variable, cs, of data type COROB_SYSTEM which will hold the corob system for this example.

Lines 16 through 33 of FIG. 20 function as programmatic code for the architecture phase of this corob computing system example. Line 16 specifies the sensor cells 54 of FIG. 15 to be the first five (leftmost) cells of the ten cells of the array of corob cells 50 of FIG. 15, identified by values of "1" in the first five positions of the sensor_map array of FIG. 20. In this and the other maps of this example, a value of "1" will represent "true," while a value of "0" will represent "false." Similarly to the sensor cells of line 16, line 18 specifies the actor cells 56 of FIG. 15 to be the last five cells of the ten cells of the corob system. Lines 20 through 31 of FIG. 20 specify the map 52 of FIG. 15. Line 21, consisting of all "0" or "false" values, specifies that the first (leftmost) cell of the array of corob cells 50 of FIG. 15 in fact does not receive input from any of the other cells in the array of corob cells 50 of FIG. 15. This is as it should be, since this cell has already been defined to be a sensor cell, which receives input from outside of the corob system, in a manner that will be described shortly. Similarly, lines 22 through 25 of FIG. 20 specify that the remaining four sensor cells likewise do not receive input from any of the other cells in the array of corob cells 50 of FIG. 15. Line 25 specifies that the sixth cell of the array of corob cells 50 of FIG. 15 receives input from cells 1 through 5 only, as shown by the five "1" or "true" values in the first five positions of the initializer of line 25, and "0" or "false" in the remainder. The remaining cells of the array of corob cells 50 of FIG. 15, namely cells 7 through 10, are similarly defined by lines 27 through 30 of FIG. 20 to receive input from exactly cells 1 through 5. Finally, line 33 of FIG. 20 defines the number of dimensions to be used for each of the ten cells of the array of corob cells 50 of FIG. 15. The information in line 33 of FIG. 20 could, of course, be derived automatically from the information in lines 20 through 31, since the latter lines specify exactly the dependencies of each cell, but line 33 makes it explicit here in the interest of clarity.

FIG. 21 specifies a C function, set_sensor(), that is used to load a corob into the sensor cells 54 of FIG. 5. Line 1 designates the name of the function, set_sensor(), and specifies both corob system of FIG. 5 that the function is to enter to set sensor cells, the parameter, cs, and the parameter, corob, that is to be used as values to which to set those sensor cells. The loop of lines 5 through 7 accomplishes this setting of the sensor cells.

FIG. 22 is the control program for this corob system example. It includes sections for the architecture phase, the education phase, and the operation phase of the system, and it deals with the sensor and actor issues.

The architecture section of this example is shown in FIG. 22 in lines 4 through 6. Line 4 is a comment line, and lines 5 and 6 constitute a single C statement that calls the function, make_corob_system(), to build a corob system with the given parameters, then assigns the resulting data to the variable, cs, for further use. Each of the parameters in the function call was specified in FIG. 20, which was discussed above.

Lines 8 through 19 of FIG. 22 comprise the education section of this example. A static education is used in this example, meaning that I will install all of the contents of the corob memories 44 of FIG. 5 of the cells of the array of corob cells 50 of FIG. 15 initially, before moving to the operation section, and these contents will not change during operation. The loop of line 10 of FIG. 22 creates an array of input corobs, cin[i], and initializes the corobs as random corobs for later reference. Note that one corob more than the number, CASES, which is 100 according to line 9 of FIG. 20, are created. The loop of lines 11 through 19 controls the fact that a number of corob pairs will be stored which number is equal to the value of the constant, CASES. The loop of lines 12 through 18 of FIG. 22 loads the pairs of corobs and state values into the cells of the array of corob cells 50 of FIG. 15. Line 13 skips those cells where there is no dependency, according to the array, nbr_of_dims[], previously discussed. Line 14 loads the corob of the pair, and lines 15 and 16 load the state of the pair. Note in line 15 that what is loaded into the val element of the cell is the val element taken from the appropriate place in the next, not the current, index of the input corob array, cin[]. This establishes the "chained" nature of the consecutive corobs which is a feature of this example. Note also that in line 16, the sig element of each cell is set to "1.0," which establishes that when the metric distance is applied, I would like perfect matches, or as near perfect as possible. Line 17 increments the variable that indexes the state in the output corob, cout[i], to load into the cell currently being loaded. Line 18 installs the pair into the cell's corob memory 44 of FIG. 4. The loop of lines 10 through 19 of FIG. 22 exits when all the data has been loaded, completing the education phase of this example.

The operation phase of this example is defined in lines 21 through 43 of FIG. 22, and illustrates the sequence of actions that comprise the operation of a corob computing system. In line 23, a result corob variable, rslt, is created for a use that concerns the actor portion of this operation phase, and the variable, rslt, is incidentally set to random values, which is of no matter, since these values will be over-written shortly. Lines 25 through 28 install the corob in the variable, cin[0], into the states of the sensor cells. This initializes sensor cells, so that the chain of execution that the corob computing system will be undergoing in this example can begin. Lines 29 through 43 iterate the corob computing system a number of times equal to the value of the constant, CASES, which as previously noted, is 100. First, all of the cells of the corob computing system are executed in line 31. Second, in lines 33 through 36, the actor cells are accessed, their state values obtained, and those values are placed into the variable, rslt. Third, in lines 39 through 42, the sensor cells are loaded from the variable, rslt. These three steps, (1) execute the cells, (2) output data from the actor cells, and, (3) input data to the sensor cells, comprise one cycle of the iteration process of the operation phase of a corob computing system.

Note that between step (2), the output of data from the actor cells, and step (3), the input of data to the sensor cells, there typically occurs an action external to the corob system itself. This external action can be simple, as it is in this current example where the variable, rslt, is simply transferred to the sensors, or arbitrarily complex. In working with corob computing systems, this external action is frequently referred to generically as the "environmental function," which is intended to describe whatever accepts data from the actor cells of a corob system, processes it, and presents data to the sensor cells of a corob system.

After the completion of the operation phase, line 44 is the next to execute. This line simply prints the number of the operation phase iteration just completed and the value returned by the function, metric(), as applied from the corob which is the last one in the original initialization chain and is held in the variable, cin[CASES], to the corob currently in the variable, rslt, which was just produced by the last iteration of the operation phase. The information printed by line 44 is this:

iteration 100: metric=0.000000

The interpretation of this output is that a metric distance of zero was obtained from the last corob in the initialization chain to the last result of the iteration chain. This can only happen if the chain sequence was successfully followed. This completes this example.

Computing with Corob Computing Systems

Corob computing systems are general purpose computing systems with novel capabilities. In this section, I support this claim, and describe some of the ramifications and uses of the present invention.

Although the cell is the fundamental building block of corob computing systems, and is a novel and useful construct in its own right, it is aggregates of cells operating in corob computing systems of FIG. 5 that truly access the revolutionary power of the present invention. By aggregating cells and interconnecting them in various ways, it is possible to build computing constructs that associate corobs with corobs, as was shown in the example of Section 7 above.

The interconnection possibilities provided by the map 52 of FIG. 5 encompass all possible interconnections among the cells of the array of corob cells 50 of FIG. 5, from one extreme where no cell depends on any other cell, to the other extreme where every cell depends on every other cell. Some of these interconnection configurations occur repeatedly when applying corob computing systems to real problems.

One common interconnection configuration is called the "X model," because the pattern of "1" or "true" values forms a large "X" in the map 52 of FIG. 5, an "X" whose arms reach all four corners of the map 52 of FIG. 5. The X model is useful for implementing hierarchical systems of pattern recognition and function generation.

Another common interconnection configuration is called the "lobe." It comes up in corob computing systems of FIG. 5 where all of the cells of the array of corob cells 50 of FIG. 5 are designated either sensor cells or actor cells, but not both. The lobe is useful for associating pairs of corobs, particularly pairs where the two corobs have differing dimensionalities. This allows the corob computing system so comprised to closely emulate the interpolation characteristics of traditional neural networks.

There is a method available to prove mathematically that a computing system is a general purpose computing system. One does this by proving that the computing system in question is equivalent to, in fact can implement, at least to the limits of its memory, a mathematical construct called the "Universal Turing Machine." I will not formally prove this equivalence here. Instead, I will assert that this can in fact be proved for the present invention, and give a plausibility argument, which follows. I will assume that the reader is skilled in the art of Turing machines, and move directly to the discussion.

The state table of the Turing machine is easy to build with a corob computing system. All of the necessary states are associated with unique corobs, and a corob computing system is built, using the methods of the present invention, that implements a state transition table. The input to the state table is the tape symbol, and each member of the set of all possible tape symbols is associated with a unique corob using the methods of the present invention. Similarly, unique corobs are made to stand for each member of the set of tape motions. This is all very straightforward.

The most interesting part of the problem is the implementation of the tape itself. Each location of the tape must be writable repeatedly, and must retain what was written. To accomplish this, I first note that there is a well-known form of the Turing machine construct in which no location on the tape is every written more than once. Instead, when updating a cell is required, an entirely new copy of the tape data, with the update included, is created and marked "active," and the old copy of the state data is marked "inactive" and abandoned. This is horribly wasteful of memory resources, of course, but the Turing machine itself is only useful as a mathematical construct, not as a practical computing paradigm, so it does not matter.

It should also be noted that even humans, without the benefits of a pencil and paper or its equivalent, are able to handle effectively only very tiny Turing machine systems in their heads. Corob computing systems are strong where living neural systems are strong, and weak in the same places as living neural systems, namely in the areas of traditional computing, so it should come as no surprise that it is difficult to implement a Turing machine, which is the paradigm of traditional computing, as a program for a corob computing system, and while difficult and wasteful of resources, it is still possible, which is the point.

To construct the memory tape I simply implement a write-once form of the tape. By using corobs as state variables, it is straightforward to mark previously learned corobs as "inactive" and only use newly stored corobs.

Thus, having dealt with all of the components of a Turing machine, I only need to add that a Universal Turing Machine is a Turing machine simulation program that runs on a Turing machine, and assert that the writing of such a program amounts to the coding of the Turing machine just described to implement the Universal Turing Machine program. I can then conclude that corob computing systems can implement a Universal Turing Machine, and are therefore Turing Complete, in other words capable of implementing any computable function. This is a theoretically important result, because it establishes corob computing systems as general purpose computing systems.

But what corob computing systems are really good at are not emulating traditional computers, but emulating living information processing systems. The robust nature of the corob, the corob memory, the corob cell, and the corob computing system introduces the ability to write grammars, state machines, control systems, and a wide range of other programmatic constructs, especially those drawn from traditional artificial intelligence and pattern recognition work, in a way that generalizes them by allowing the data tokens they use to be corobs, which allows those tokens to have "capture regions" of equivalence, or a robust, error tolerant nature that is extremely useful when dealing with the types of issues, such as the nature of patterns, commonly dealt with in those fields.

An additional strength of corob computing systems is a unique form of parallel processing. Since all of the cells of the array of corob cells 50 of FIG. 5 are executed once during each iteration of the corob computing system of FIG. 5, and since these cells may, according to the specifications in the map 52 of FIG. 5, be participating in diverse elements of the computation that is underway, those diverse elements are necessarily being executed in parallel. This is a unique partitioning of parallel tasks achieved by implementing those tasks as processes in a corob computing system that results in a novel and useful form of parallel computing that is only available by means of corob computing systems.

Conclusions, Ramifications, and Scope of Invention

Hence, the examples presented illustrate the practical nature of the present invention. A novel construct called the "corob" has been described, a novel construct called the "corob memory" has been described, a novel construct called the "corob cell" has been described, and a novel construct called the "corob computing system" has been described. Each of these constructs is an architecture for a system that can be broadly described as an "architecture for a corob based computing system," the subject of the present invention.

Novel computing system architecture meeting the aforementioned objects has been described. The present invention provides for architecture for computing systems whose computational strengths lie in areas similar to the areas of computational strengths of living information processing systems, that greatly increases analogic functionality, that greatly increases robustness, that provides componentry that takes advantage of corobs, that provides a computing system architecture that employs corobs, that provides a corob based computing system architecture that is "Turing complete," that provides means to utilize corobs as data tokens, that provides means to accomplish information processing utilizing corobs, and that provides means to accomplish parallel processing with corobs.

The foregoing disclosure and description of the invention are illustrative and explanatory thereof. It will be understood by those skilled in the art to which this invention pertains that various modifications may be made in the details and arrangements of the processes and of the structures described herein in order to explain the nature of the invention without departing from the principles and/or spirit of the foregoing teachings.

While my above description contains many specificities, these should not be construed as limitations on the scope of the invention, but rather as an exemplification of one preferred embodiment thereof. Many other variations are possible. For example, throughout this disclosure, programmatic code in the C programming language has been used clearly to define and exemplify the details and arrangements of the processes and of the structures described herein. It is well known among those skilled in the art of both computer programming and electronic circuit design that any C program functionality can be embodied as a specific, equivalent electronic circuit, and vice versa, and that embodiments equivalent to any C program functionality can be readily produced in other programming languages, and vice versa. A corob is a very broadly defined construct with specific properties, as described herein. Any implementation that contains or makes use of one or more corobs is therefore within the scope of this invention. Any equivalent formulation of a corob memory system is within the scope of this invention. Any equivalent formulation of a corob cell is within the scope of this invention. Finally, any equivalent formulation of a corob computing system is within the scope of this invention. Accordingly, the scope of the invention should be determined not by the embodiments illustrated, but by the appended claims and their legal equivalents.

What is claimed is:

1. A system for processing data, comprising:
a memory operable to store a correlithm object defining a point in a particular space, wherein the particular space is defined by a plurality of dimensions and including a plurality of points, the correlithm object associated with each point using a metric, the memory further operable to store data associated with the correlithm object; and
a processor coupled to the memory and operable to apply the metric to the correlithm object and each of the plurality of points in the particular space to generate a plurality of values defining a distribution having a mean and a standard deviation such that the ratio of the mean to the standard deviation increases with the number of dimensions of the particular space.

2. The system of claim 1, wherein the correlithm object comprises a first correlithm object defining a first point in the particular space and the memory is further operable to store a second correlithm object defining a second point in the particular space.

3. The system of claim 2, wherein:
the particular space is defined by N dimensions;
the first point is defined by N first random numbers; and
the second point is defined by N second random numbers.

4. The system of claim 3, wherein the first and second random numbers comprise complex numbers.

5. The system of claim 3, wherein the first and second random numbers comprise real numbers.

6. The system of claim 3, wherein the first and second random numbers comprise binary numbers.

7. The system of claim 2, wherein the particular space comprises a first generalized subspace and a second generalized subspace.

8. The system of claim 7, wherein:
the first correlithm object comprises a first point in the first generalized subspace of the particular space; and
the second correlithm object comprises a second point in the second generalized subspace of the particular space.

9. The system of claim 7, wherein a portion of the first generalized subspace comprises a portion of the second generalized subspace.

10. The system of claim 1, wherein the correlithm object comprises a first correlithm object and the particular space comprises a source space, the memory further operable to store a second correlithm object associated with the first correlithm object, the second correlithm object defining a point in a target space.

11. The system of claim 10, wherein the intersection between the source space and the target space is a generalized subspace.

12. The system of claim 1, wherein the metric comprises a formula defining a measure that increases substantially monotonically with the number of dimensions defining the particular space.

13. The system of claim 1, wherein the metric comprises a distance measure.

14. A method for processing data, comprising:
storing a correlithm object defining a point in a particular space, wherein the particular space is defined by a plurality of dimensions and including a plurality of points, the correlithm object associated with each point using a metric;
storing data associated with the correlithm object; and
applying the metric to the correlithm object and each of the plurality of points in the particular space to generate a plurality of values defining a distribution having a mean and a standard deviation such that the ratio of the mean to the standard deviation increases with the number of dimensions of the particular space.

15. The method of claim 14, wherein the correlithm object comprises a first correlithm object defining a first point in the particular space and the method further comprising storing a second correlithm object defining a second point in the particular space.

16. The method of claim 15, wherein:
the particular space is defined by N number of dimensions;
the first point is defined by N first random numbers; and
the second point is defined by N second random numbers.

17. The method of claim 16, wherein the first and second random numbers comprise complex numbers.

18. The method of claim 16, wherein the first and second random numbers comprise real numbers.

19. The method of claim 16, wherein the first and second random numbers comprise binary numbers.

20. The method of claim 15, wherein the particular space comprises a first generalized subspace and a second generalized subspace.

21. The method of claim 20, wherein:
the first correlithm object comprises a first point in the first generalized subspace of the particular space; and
the second correlithm object comprises a second point in the second generalized subspace of the particular space.

22. The method of claim 20, wherein a portion of the first generalized subspace comprises a portion of the second generalized subspace.

23. The method of claim 14, wherein the correlithm object comprises a first correlithm object and the particular space comprises a source space, the method further comprising storing a second correlithm object associated with the first correlithm object, the second correlithm object defining a point in a target space.

24. The method of claim 23, wherein the intersection between the source space and the target space is a generalized subspace.

25. The method of claim 14, wherein the metric comprises a formula defining a measure that increases substantially monotonically with the number of dimensions defining the particular space.

26. The method of claim 14, wherein the metric comprises a distance measure.

27. A system for processing data, comprising:
a memory operable to store a first correlithm object associated with first data and a second correlithm object associated with second data, wherein the first correlithm object comprises a first point in a first generalized subspace of a particular space, the second correlithm object comprises a second point in a second generalized subspace of the particular space, and the particular space is defined by a plurality of dimensions; and a processor coupled to the memory and operable to:
receive a third correlithm object comprising a third point in a third generalized subspace in the particular space;
determine a first value by applying a metric to the first correlithm object and the third correlithm object;
determine a second value by applying the metric to the second correlithm object and the third correlithm object; and
determine third data associated with the third correlithm object based upon the first value and the second value.

28. The system of claim 27, wherein:
the particular space is defined by N number of dimensions;
the first point is defined by an appropriate number of first random numbers determined by the first generalized subspace; and
the second point is defined by an appropriate number of second random numbers determined by the second generalized subspace.

29. The system of claim 28, wherein the first and second random numbers comprise complex numbers.

30. The system of claim 28, wherein the first and second random numbers comprise real numbers.

31. The system of claim 28, wherein the first and second random numbers comprise binary numbers.

32. The system of claim 27, wherein:
the particular space is defined by N dimensions;
the first point is defined by N first random numbers; and
the second point is defined by N second random numbers.

33. The system of claim 27, wherein:
the first value comprises a first distance relating the first point and the third point; and
the second value comprises a second distance relating the second point and the third point.

34. The system of claim 27, wherein the processor determines that the third data is more likely to be equal to the first data than the second data if the third point is substantially closer to the first point than to the second point.

35. The system of claim 27, wherein the processor determines that the third data is more likely to be equal to the second data than the first data if the third point is substantially closer to the second point than to the first point.

36. The system of claim 27, wherein the processor determines that the third data is more likely to be equal to the first data than the second data if the first value is substantially smaller than the second value.

37. The system of claim 27, wherein the processor determines that the third data is more likely to be equal to the second data than the first data if the second value is substantially smaller than the first value.

38. The system of claim 27, wherein the metric comprises a formula defining a measure that increases substantially monotonically with the number of dimensions defining the particular space.

39. The system of claim 27, wherein the particular space comprises a source space and the third data comprises a fourth correlithm object defining a point in a target space.

40. A method for processing data, comprising:
storing a first correlithm object associated with first data, the first correlithm object comprising a first point in a first generalized subspace of a particular space, wherein the particular space is defined by a plurality of dimensions;
storing a second correlithm object associated with second data, the second correlithm object comprising a second point in a second generalized subspace of the particular space;
receiving a third correlithm object comprising a third point in a third generalized subspace of the particular space;
determining a first value by applying a metric to the first correlithm object and the third correlithm object;
determining a second value by applying the metric to the second correlithm object and the third correlithm object; and
determining third data associated with the third correlithm object based upon the first value and the second value.

41. The method of claim 40, wherein:
the particular space is defined by N number of dimensions;
the first point is defined by an appropriate number of first random numbers determined by the first generalized subspace; and
the second point is defined by an appropriate number of second random numbers determined by the second generalized subspace.

42. The method of claim 41, wherein the first and second random numbers comprise complex numbers.

43. The method of claim 41, wherein the first and second random numbers comprise real numbers.

44. The method of claim 41, wherein the first and second random numbers comprise binary numbers.

45. The method of claim 41, wherein the metric comprises a formula defining a measure that increases substantially monotonically with the number of dimensions defining the particular space.

46. The method of claim 40, wherein:
the particular space is defined by N dimensions;
the first point is defined by N first random numbers; and
the second point is defined by N second random numbers.

47. The method of claim 40, wherein:
the first value comprises a first distance relating the first point and the third point; and
the second value comprises a second distance relating the second point and the third point.

48. The method of claim 40, further comprising determining that the third data is more likely to be equal to the first data than the second data if the third point is substantially closer to the first point than to the second point.

49. The method of claim 40, further comprising determining that the third data is more likely to be equal to the second data than the first data if the third point is substantially closer to the second point than to the first point.

50. The method of claim 40, further comprising determining that the third data is more likely to be equal to the first data than the second data if the first value is substantially smaller than the second value.

51. The method of claim 40, further comprising determining that the third data is more likely to be equal to the second data than the first data if the second value is substantially smaller than the first value.

52. The method of claim 40, wherein the particular space comprises a source space and the third data comprises a fourth correlithm object defining a point in a target space.

53. A system for processing data, comprising:
a memory operable to store a first correlithm object associated with first data, the first correlithm object defining a first point in a particular space, wherein the particular space is defined by a plurality of dimensions and includes a plurality of points; and
a processor operable to:
apply a metric to the correlithm object and each of the plurality of points in the particular space to generate a plurality of values defining a distribution having a mean and a standard deviation such that the ratio of the mean to the standard deviation increases with the number of dimensions of the particular space;
receive a second correlithm object defining a second point in the particular space;
apply the metric to the first correlithm object and the second correlithm object to determine a first value; and
determine second data associated with the second correlithm object such that a second value generated by applying the metric to the first data and the second data is substantially directly proportional to the first value if the first value is substantially away from the mean of the distribution.

54. The system of claim 53, wherein:
the memory is further operable to store a third correlithm object associated with third data, wherein the third correlithm object comprises a third point in the particular space; and
the processor is further operable to:
apply the metric to the third correlithm object and the second correlithm object to determine a third value; and
determine the second data associated with the second correlithm object such that a fourth value generated by applying the metric to the third data and the second data varies substantially directly proportionally to the third value if the third value is substantially away from the mean of the distribution.

55. The system of claim 53, wherein the processor determines the second data according to an artificial neural network mapping.

56. The system of claim 53, wherein:
the particular space is defined by N dimensions;
the first point is defined by N first random numbers; and
the second point is defined by N second random numbers.

57. The system of claim 56, wherein the first and second random numbers comprise complex numbers.

58. The system of claim 56, wherein the first and second random numbers comprise real numbers.

59. The system of claim 56, wherein the first and second random numbers comprise binary numbers.

60. The system of claim 53, wherein the metric comprises a formula defining a measure that increases substantially monotonically with the number of dimensions defining the particular space.

61. The system of claim 53, wherein:
the first value comprises a distance relating the first point and the second point; and
the second value comprises a distance relating the first data and the second data.

62. The system of claim 53, wherein:
the third value comprises a distance relating the second point and the third point; and
the fourth value comprises a distance relating the second data and the third data.

63. The system of claim 53, wherein the processor determines that the second data is more likely to be equal to the first data than the third data if the second point is substantially closer to the first point than to the third point.

64. The system of claim 53, wherein the processor determines that the second data is more likely to be equal to the third data than the first data if the second point is substantially closer to the third point than to the first point.

65. The system of claim 53, wherein the processor determines that the second data is more likely to be equal to the first data than the third data if the first value is substantially smaller than the third value.

66. The system of claim 53, wherein the processor determines that the second data is more likely to be equal to the third data than the first data if the third value is substantially smaller than the first value.

67. The system of claim 53, wherein the particular space comprises a first generalized subspace and a second generalized subspace.

68. The system of claim 67, wherein:
the first correlithm object comprises a first point in the first generalized subspace of the particular space; and
the second correlithm object comprises a second point in the second generalized subspace of the particular space.

69. The system of claim 67, wherein a portion of the first generalized subspace comprises a portion of the second generalized subspace.

70. The system of claim 53, wherein:
the particular space comprises a source space;
the first data comprises a correlithm object defining a first point in a target space; and
the second data comprises a correlithm object defining a second point in the target space.

71. A method for processing data, comprising:
storing a first correlithm object associated with first data, the first correlithm object defining a first point in a particular space, wherein the particular space is defined by a plurality of dimensions and includes a plurality of points;
applying a metric to the correlithm object and each of the plurality of points in the particular space to generate a plurality of values defining a distribution having a mean and a standard deviation such that the ratio of the mean to the standard deviation increases with the number of dimensions of the particular space;
receiving a second correlithm object defining a second point in the particular space;
applying the metric to the first correlithm object and the second correlithm object to determine a first value; and
determining second data associated with the second correlithm object such that a second value generated by applying the metric to the first data and the second data is substantially directly proportional to the first value if the first value is substantially away from the mean of the distribution.

72. The method of claim 71, further comprising:
storing a third correlithm object associated with third data, wherein the third correlithm object comprises a third point in the particular space;
applying the metric to the third correlithm object and the second correlithm object to determine a third value; and
determining the second data associated with the second correlithm object such that a fourth value generated by applying the metric to the third data and the second data varies substantially directly proportionally to the third value if the third value is substantially away from the mean of the distribution.

73. The method of claim 71, further comprising determining the second data according to an artificial neural network mapping.

74. The method of claim 71, wherein:
the particular space is defined by N dimensions;
the first point is defined by N first random numbers; and
the second point is defined by N second random numbers.

75. The method of claim 74, wherein the first and second random numbers comprise complex numbers.

76. The method of claim 74, wherein the first and second random numbers comprise real numbers.

77. The method of claim 74, wherein the first and second random numbers comprise binary numbers.

78. The method of claim 71, wherein the metric comprises a formula defining a measure that increases substantially monotonically with the number of dimensions defining the particular space.

79. The method of claim 71, wherein:
the first value comprises a distance relating the first point and the second point; and
the second value comprises a distance relating the first data and the second data.

80. The method of claim 71, wherein:
the third value comprises a distance relating the second point and the third point; and
the fourth value comprises a distance relating the second data and the third data.

81. The method of claim 71, further comprising determining that the second data is more likely to be equal to the first data than the third data if the second point is substantially closer to the first point than to the third point.

82. The method of claim 71, further comprising determining that the second data is more likely to be equal to the third data than the first data if the second point is substantially closer to the third point than to the first point.

83. The method of claim 71, further comprising determining that the second data is more likely to be equal to the first data than the third data if the first value is substantially smaller than the third value.

84. The method of claim 71, further comprising determining that the second data is more likely to be equal to the third data than the first data if the third value is substantially smaller than the first value.

85. The method of claim 71, wherein the particular space comprises a first generalized subspace and a second generalized subspace.

86. The method of claim 85, wherein:
the first correlithm object comprises a first point in the first generalized subspace of the particular space; and
the second correlithm object comprises a second point in the second generalized subspace of the particular space.

87. The method of claim 85, wherein a portion of the first generalized subspace comprises a portion of the second generalized subspace.

88. The method of claim 71, wherein
the particular space comprises a source space;
the first data comprises a correlithm object defining a first point in a target space; and
the second data comprises a correlithm object defining a second point in the target space.

89. A system for processing data, comprising:
a memory that stores a plurality of cells, wherein a particular cell is associated with a first output, a first mapping and a second mapping, the first mapping associating a first correlithm object with first data and the second mapping associating a second correlithm object with second data; and
a processor coupled to the memory and operable to:
receive an input for the particular cell from a specified portion of the plurality of cells; and
generate a second output associated with the particular cell based upon the input and the mappings.

90. The system of claim 89, wherein the plurality of cells comprises a first group of cells that receive an input from a first portion of the plurality of cells and a second group of cells that receive an input from a second portion of the plurality of cells.

91. The system of claim 89, wherein the memory stores a map that identifies the portion of the plurality of cells from which the particular cell receives an input.

92. The system of claim 89, wherein a portion of the plurality of cells comprise sensor cells.

93. The system of claim 89, wherein a portion of the plurality of cells comprise actor cells.

94. The system of claim 89, wherein the second output comprises a state of the particular cell.

95. The system of claim 94, wherein the first output comprises the state of the particular cell prior to generating the second output.

96. The system of claim 95, wherein the particular cell comprises a first cell and the first output of the first cell comprises an input for a second cell.

97. The system of claim 95, wherein the particular cell comprises a first cell and the second output of the first cell comprises an input for a second cell.

98. The system of claim 95, wherein the particular cell comprises a first cell and the first output of the first cell comprises an input for a second cell and a third cell.

99. The system of claim 95, wherein the particular cell comprises a first cell and the second output of the first cell comprises an input for a second cell and a third cell.

100. A method for processing data, comprising:
storing a plurality of cells;
storing a first output associated with a particular cell;
storing a first mapping associated with the particular cell, the first mapping associating a first correlithm object with first data;
storing a second mapping associated with the particular cell, the second mapping associating a second correlithm object with second data;
receiving an input for the particular cell from a specified portion of the plurality of cells; and
generating a second output for the particular cell based upon the input and the mappings.

101. The method of claim 100, wherein the plurality of cells comprises a first group of cells that receive an input from a first portion of the plurality of cells and a second group of cells that receive an input from a second portion of the plurality of cells.

102. The method of claim 100, further comprising storing a map that identifies the portion of the plurality of cells from which the particular cell receives an input.

103. The method of claim 100, wherein a portion of the plurality of cells comprise sensor cells.

104. The method of claim 100, wherein a portion of the plurality of cells comprise actor cells.

105. The method of claim 100, wherein the second output comprises a state of the particular cell.

106. The method of claim 105, wherein the first output comprises the state of the particular cell prior to generating the second output.

107. The method of claim 106, wherein the particular cell comprises a first cell and the first output of the first cell comprises an input for a second cell.

108. The method of claim 106, wherein the particular cell comprises a first cell and the second output of the first cell comprises an input for a second cell.

109. The method of claim 106, wherein the particular cell comprises a first cell and the first output of the first cell comprises an input for a second cell and a third cell.

110. The method of claim 106, wherein the particular cell comprises a first cell and the second output of the first cell comprises an input for a second cell and a third cell.

111. A system for processing data, comprising:
   a memory operable to store a first correlithm object associated with first data, the first correlithm object defining a first point in a particular space, wherein the particular space is defined by a plurality of dimensions and includes a plurality of points; and
   a processor operable to:
      apply a metric to the correlithm object and each of the plurality of points in the particular space to generate a plurality of values defining a distribution having a mean and a standard deviation such that the ratio of the mean to the standard deviation increases with the number of dimensions of the particular space; and
      generate a second correlithm object defining a second point in the particular space such that the application of the metric to the first correlithm object and the second correlithm object results in a particular value that is substantially away from the mean of the distribution.

112. The system of claim 111, wherein the metric comprises a formula defining a measure that increases substantially monotonically with the number of dimensions defining the particular space.

113. The system of claim 111, wherein the mean of the distribution is associated with an expected distance relating the first point to one of the plurality of points in the particular space and the particular value comprises a distance that is substantially smaller than the expected distance.

114. The system of claim 111, wherein the particular value comprises a first value and the processor is further operable to generate a third correlithm object defining a third point in the particular space such that the application of the metric to the second correlithm object and the third correlithm object results in a second value that is substantially away from the mean of the distribution.

115. The system of claim 114, wherein the mean of the distribution is associated with an expected distance relating the first point to one of the plurality of points in the particular space and the second value comprises a distance that is substantially smaller than the expected distance.

116. The system of claim 114, wherein the processor is further operable to apply the metric to the first correlithm object and the third correlithm object to generate a third value that is larger than the first value.

117. The system of claim 116, wherein the mean of the distribution is associated with an expected distance relating the first point to one of the plurality of points in the particular space and the third value comprises a distance that is substantially smaller than the expected distance.

118. A method for processing data, comprising:
   storing a first correlithm object associated with first data, the first correlithm object defining a first point in a particular space, wherein the particular space is defined by a plurality of dimensions and includes a plurality of points;
   applying a metric to the correlithm object and each of the plurality of points in the particular space to generate a plurality of values defining a distribution having a mean and a standard deviation such that the ratio of the mean to the standard deviation increases with the number of dimensions of the particular space; and
   generating a second correlithm object defining a second point in the particular space such that the application of the metric to the first correlithm object and the second correlithm object results in a particular value that is substantially away from the mean of the distribution.

119. The method of claim 118, wherein the metric comprises a formula defining a measure that increases substantially monotonically with the number of dimensions defining the particular space.

120. The method of claim 118, wherein the mean of the distribution is associated with an expected distance relating the first point to one of the plurality of points in the particular space and the particular value comprises a distance that is substantially smaller than the expected distance.

121. The method of claim 118, wherein the particular value comprises a first value and the method further comprises generating a third correlithm object defining a third point in the particular space such that the application of the metric to the second correlithm object and the third correlithm object results in a second value that is substantially away from the mean of the distribution.

122. The method of claim 121, wherein the mean of the distribution is associated with an expected distance relating the first point to one of the plurality of points in the particular space and the second value comprises a distance that is substantially smaller than the expected distance.

123. The method of claim 121, wherein the method further comprises applying the metric to the first correlithm object and the third correlithm object to generate a third value that is larger than the first value.

124. The method of claim 123, wherein the mean of the distribution is associated with an expected distance relating the first point to one of the plurality of points in the particular space and the third value comprises a distance that is substantially smaller than the expected distance.

* * * * *

UNITED STATES PATENT AND TRADEMARK OFFICE
CERTIFICATE OF CORRECTION

PATENT NO.   : 6,167,391
DATED        : December 26, 2000
INVENTOR(S)  : P. Nick Lawrence Page 1 of 1

It is certified that error appears in the above-identified patent and that said Letters Patent is hereby corrected as shown below:

<u>Title page,</u>
Item [56], References Cited, OTHER PUBLICATIONS,
Lines 1 and 3, after "at" delete "www.It.com," and insert -- www.lt.com, -- therefor.

Signed and Sealed this

Eighteenth Day of June, 2002

Attest:

Attesting Officer

JAMES E. ROGAN
Director of the United States Patent and Trademark Office